(12) United States Patent
Higashijima et al.

(10) Patent No.: US 9,103,385 B2
(45) Date of Patent: Aug. 11, 2015

(54) WET FRICTION MATERIAL

(75) Inventors: Yuko Higashijima, Toyota (JP); Masato Okada, Toyota (JP); Masato Suzuki, Toyota (JP)

(73) Assignee: AISIN KAKO KABUSHIKI KAISHA, Aichi-ken (JP)

( * ) Notice: Subject to any disclaimer, the term of this patent is extended or adjusted under 35 U.S.C. 154(b) by 190 days.

(21) Appl. No.: 13/636,896

(22) PCT Filed: Mar. 2, 2011

(86) PCT No.: PCT/JP2011/054737
§ 371 (c)(1),
(2), (4) Date: Oct. 23, 2012

(87) PCT Pub. No.: WO2011/118347
PCT Pub. Date: Sep. 29, 2011

(65) Prior Publication Data
US 2013/0168199 A1    Jul. 4, 2013

(30) Foreign Application Priority Data

Mar. 25, 2010   (JP) .................................. 2010-70076

(51) Int. Cl.
*F16D 13/64*    (2006.01)
*F16D 13/74*    (2006.01)
(Continued)

(52) U.S. Cl.
CPC ................ *F16D 13/60* (2013.01); *F16D 13/64* (2013.01); *F16D 13/74* (2013.01); *F16D 2069/004* (2013.01)

(58) Field of Classification Search
CPC .................................................... F16D 25/064
USPC ...................................................... 192/113.36
See application file for complete search history.

(56) References Cited

U.S. PATENT DOCUMENTS 3,094,194 A    6/1963   Kershner
3,972,400 A    8/1976   Howells
(Continued)

FOREIGN PATENT DOCUMENTS

EP    1 473 478 A1    11/2004
JP    11-303902 A     11/1999
(Continued)

OTHER PUBLICATIONS

Machine translation of EP 1473478 downloaded from EPO.org on Dec. 22, 2014.*
(Continued)

*Primary Examiner* — Richard Lorence
(74) *Attorney, Agent, or Firm* — Sughrue Mion, PLLC

(57) ABSTRACT

To be able to promote discharge of lubricating oil in a disengaged state while maintaining a large lining area to such an extent that it does not affect torque transmission capacity, heat resistance, and peeling resistance thereby to obtain an excellent effect to reduce a drag torque in a wide range of relative rotation speeds.
In a segment friction material 1A as a wet friction material, drag torque reducing grooves 5A are provided only on top surfaces of part of segment pieces 3A among thirty pieces of segment pieces 3, 3A. A series of drag torque reducing grooves 5A extend over five segment pieces 3A along a direction almost at right angles to a straight line connecting a center point 5Aa thereof and a center O of a circumference. The series of drag torque reducing grooves 5A are provided at three places on the circumference. Thereby, discharge of ATF is promoted without reducing a lining area and an oil film is formed on the top surface of the segment piece 3A. Thus, a great effect to reduce a drag torque was obtained in a wide range of relative rotation speeds (500 rpm to 5000 rpm).

4 Claims, 20 Drawing Sheets

(51) Int. Cl.
*F16D 13/60* (2006.01)
*F16D 69/00* (2006.01)

(56) References Cited

U.S. PATENT DOCUMENTS

| | | | |
|---|---|---|---|
| 4,878,282 | A | 11/1989 | Bauer |
| 5,682,971 | A | 11/1997 | Takakura et al. |
| 6,283,265 | B1 | 9/2001 | Hirayanagi et al. |
| 7,434,673 | B2 * | 10/2008 | Muranaka et al. ....... 192/113.36 |
| 2001/0023803 | A1 | 9/2001 | Hattori |
| 2006/0151274 | A1 | 7/2006 | Kinoshita et al. |
| 2007/0017773 | A1 | 1/2007 | Suzuki et al. |
| 2007/0151822 | A1 * | 7/2007 | Toya et al. ................. 192/70.14 |
| 2008/0006504 | A1 * | 1/2008 | Sudau et al. ............. 192/113.36 |
| 2008/0173516 | A1 * | 7/2008 | Hirayanagi .................. 192/210 |
| 2008/0179162 | A1 | 7/2008 | Kobayashi et al. |

FOREIGN PATENT DOCUMENTS

| | | |
|---|---|---|
| JP | 2001-295859 A | 10/2001 |
| JP | 2001-343061 A | 12/2001 |
| JP | 2002-130323 A | 5/2002 |
| JP | 2003-090369 A | 3/2003 |
| JP | 2004-211781 A | 7/2004 |
| JP | 2006-161875 A | 6/2006 |
| JP | 2007-051759 A | 3/2007 |
| JP | 2007-263203 A | 10/2007 |
| JP | 2008-106929 A | 5/2008 |
| JP | 2008-185116 A | 8/2008 |
| JP | 2009-068689 A | 4/2009 |

OTHER PUBLICATIONS

European Search Report dated Jul. 11, 2014 issued in corresponding EP application No. 11759155.2.
Supplemental European Search Report dated Jul. 29, 2014 issued in corresponding EP application No. 11759155.2.

* cited by examiner

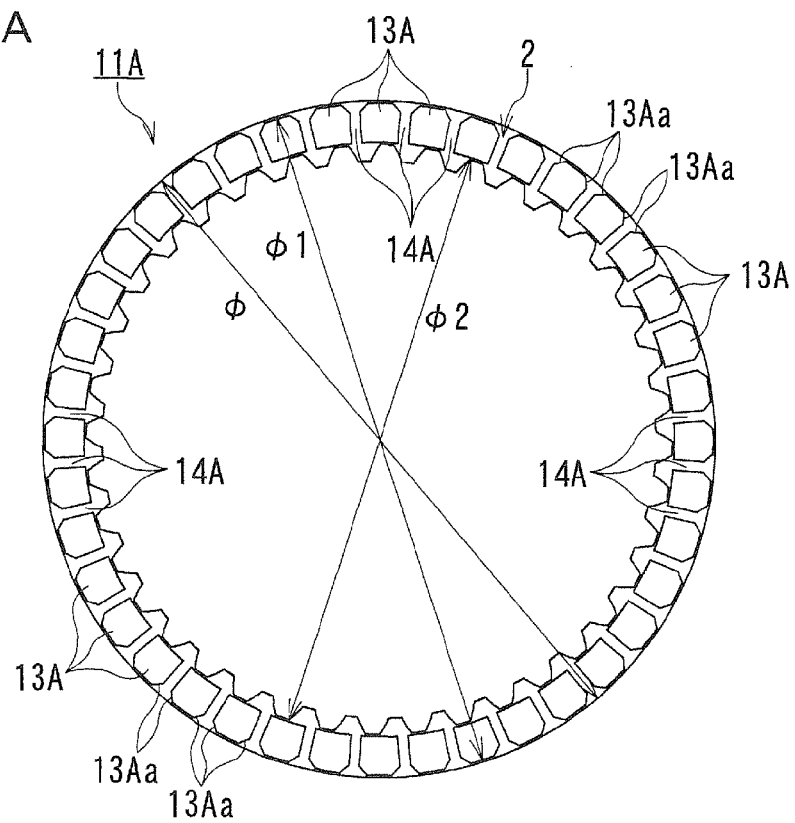
F I G. 1A
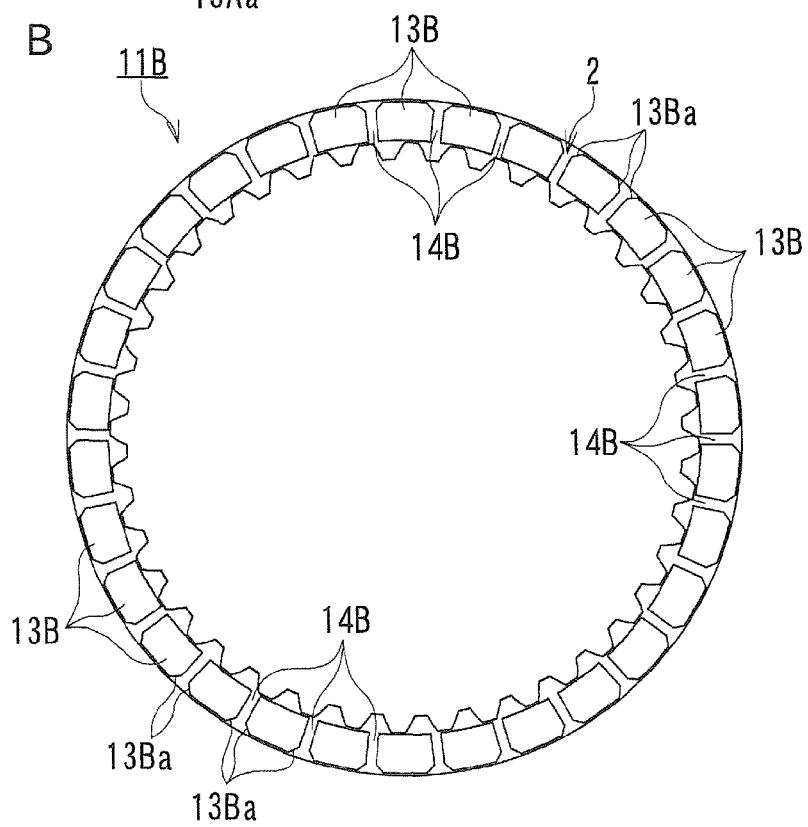
F I G. 1B

F I G. 2A
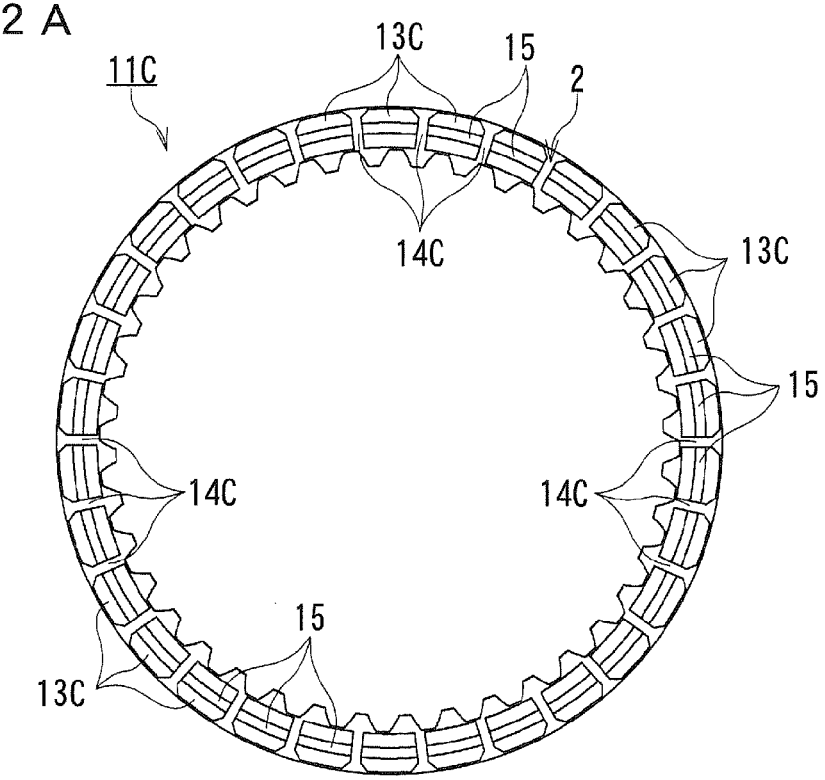
F I G. 2B
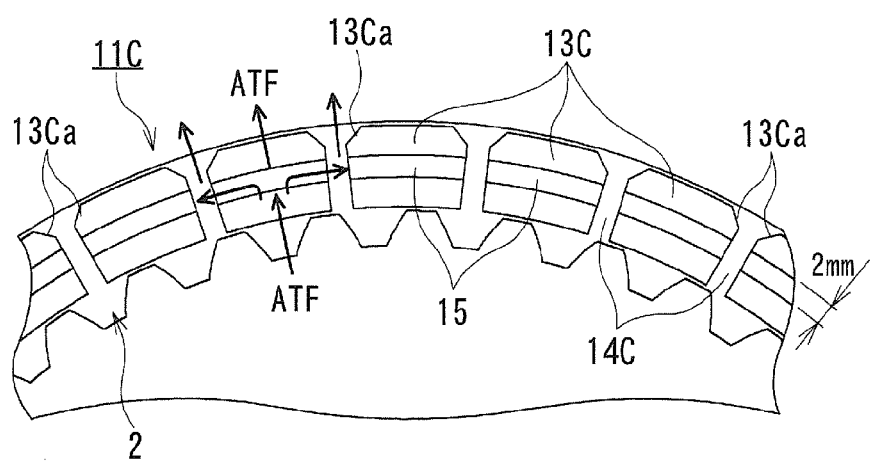

F I G. 8A
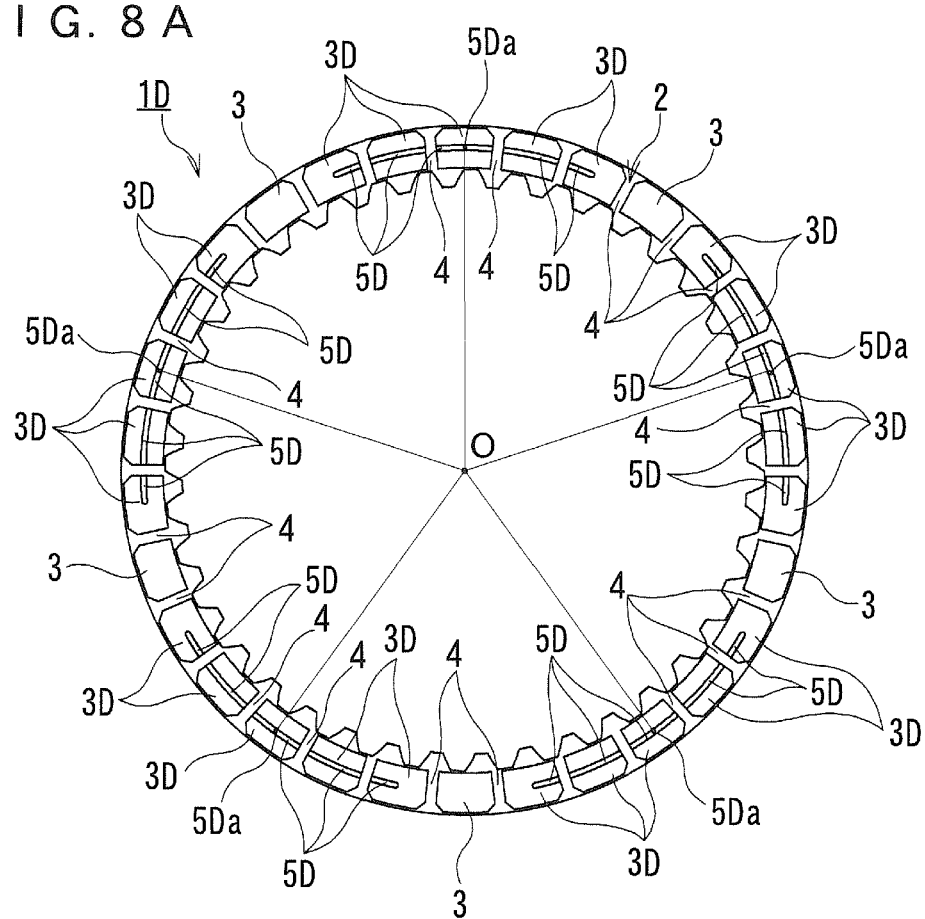
F I G. 8B
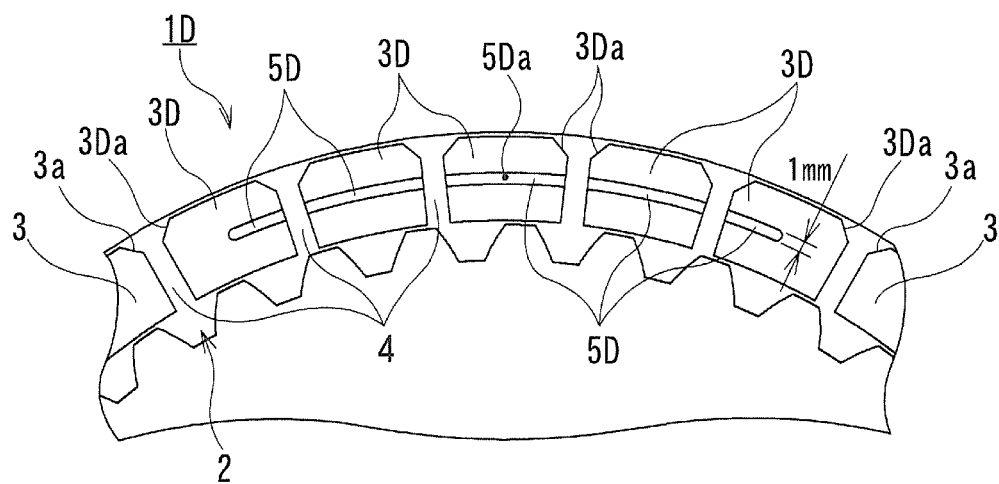

F I G. 14 A
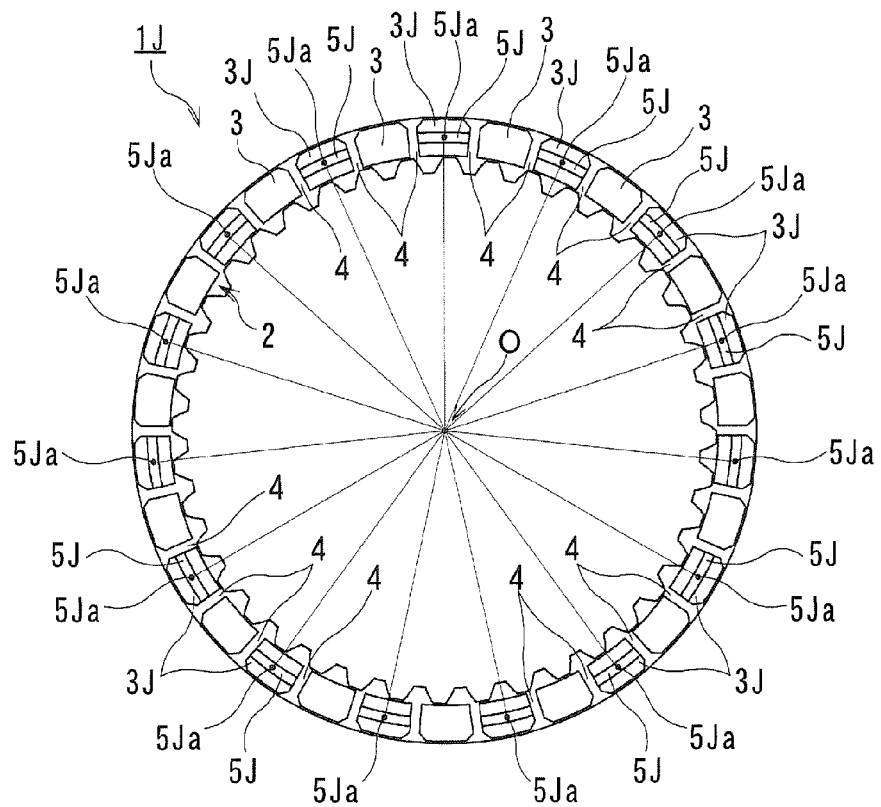
F I G. 14 B
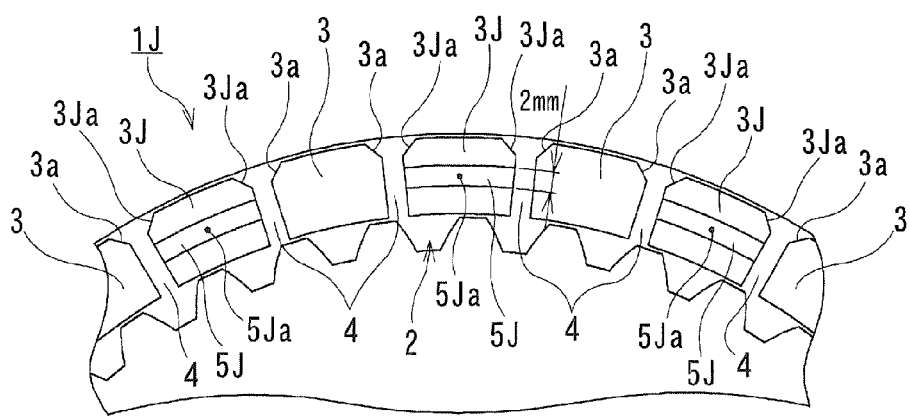

F I G. 21A
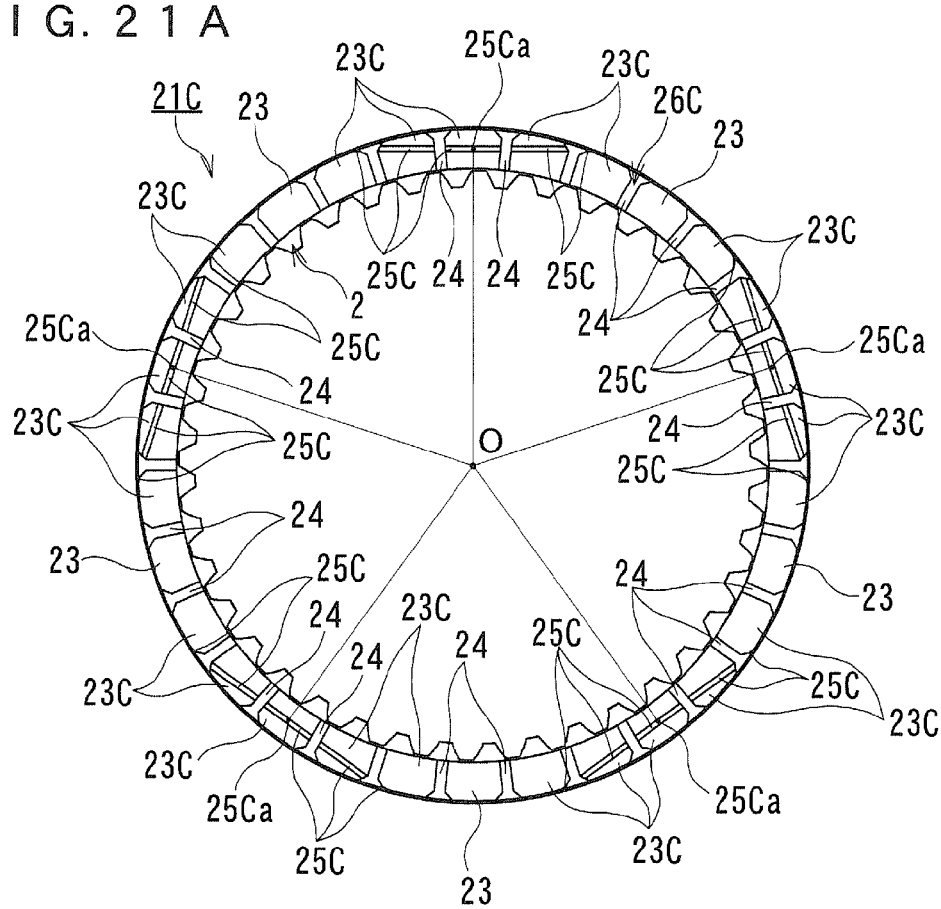
F I G. 21B
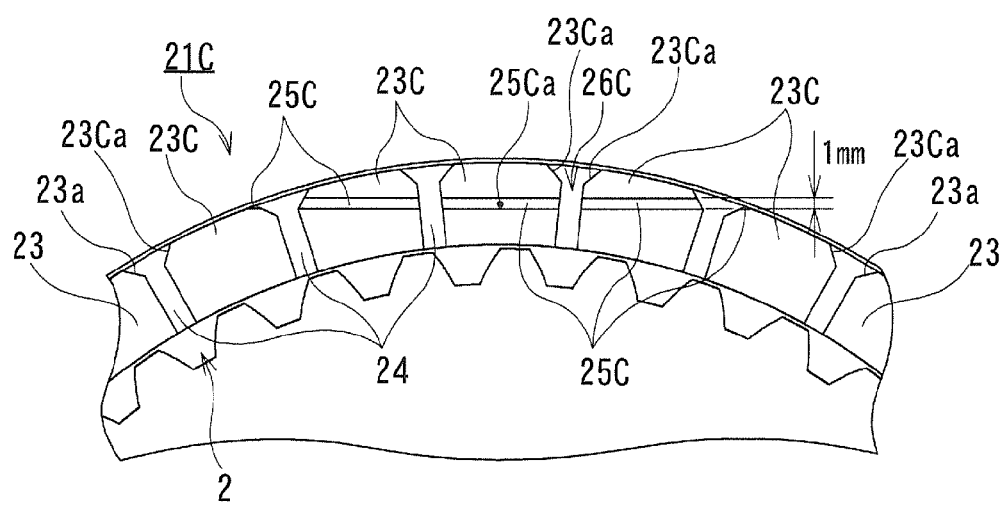

WET FRICTION MATERIAL

CROSS REFERENCE TO RELATED APPLICATIONS

This application is a National Stage of International Application No. PCT/JP2011/054737filed Mar. 2,2011, claiming priority based on Japanese Patent Application No. 2010-070076, filed Mar. 25,2010, the contents of all of which are incorporated herein by reference in their entirety.

TECHNICAL FIELD

This invention relates to a wet friction material that generates a torque by applying a high pressure to an opposite surface while being immersed in an oil and more particularly to a segment friction material wherein segment pieces made by cutting a friction material substrate is joined on both surfaces along an entire circumference or on one surface along an entire circumference of a ring-shaped metal core with an adhesive or a ring-type friction material wherein a ring shaped friction material substrate made by cutting a friction material substrate into a ring shape is joined on both surfaces along an entire circumference or on one surface along an entire circumference of a ring-shaped metal core with an adhesive.

BACKGROUND ART

In recent years, a segment friction material is under development as a wet friction material in order to improve material yield with resultant cost reduction and to lessen drag torque with resultant high fuel efficiency in a vehicle. The segment friction material has a flat ring shaped metal core (core plate) and segment pieces made of friction material substrates cut into a segment piece shape along a circumference of the flat ring shape of the metal core. A set of the segment pieces is arranged and joined with an adhesive on one surface of the metal core side by side along an entire circumference of the metal core with an interval to be an oil passage. Another set of the segment pieces made of friction material substrates cut into a segment piece shape is joined on a rear surface of the metal core with an adhesive, too. Such segment friction material is applicable to a friction material clutch device that has a single or plural friction plates for use in an automatic transmission, which may be hereafter referred to as "AT", of automobiles or motorcycles or the like.

As an example, a wet hydraulic clutch is used for an automatic transmission of an automobile or the like. The wet hydraulic clutch has a plurality of segment friction materials and a plurality of separator plates laid alternately on one another. Both the plates are contacted with a hydraulic pressure to transmit a torque. Lubricating oil or automatic transmission fluid, which may be hereafter referred to as "ATF", is supplied to between both the plates for the purpose of absorbing frictional heat generated when they are shifted from a disengaged state to an engaged state or preventing abrasion of the friction material and the like. "ATF" is a registered trademark of Idemitsu Kosan Co., Ltd.

However, a distance between the segment friction materials and the separator plates associated therewith is set small in order to increase response of the hydraulic clutch. In addition, a total area of an oil passage provided on the segment friction material is restricted in order to assure a sufficient torque transmission capacity when the hydraulic clutch is engaged. As a result, there were problems that ATF remaining between the segment friction material and the separator plate was hardly discharged when the hydraulic clutch was disengaged and drag torque by ATF was generated depending on relative rotation of both the plates.

In order to solve such problems, a patent document 1 discloses a wet friction plate for the purpose of reducing a drag torque by promoting discharge of ATF while maintaining cooling capacity by ATF. The wet friction plate comprises a core plate made of an iron-based metal plate and a plurality of friction materials (segment pieces) concentrically arranged in two rows on both top and rear surfaces of the core plate to form a first groove extending in a radial direction of a metal core and a second groove extending in a circumferential direction of the metal core. Therefore, generation of a drag torque when torque transmission is not required can be prevented while maintaining cooling capacity by lubricating oil.

In addition, a patent document 2 discloses an inner clutch plate and a driving force transmission using the same. The inner clutch plate comprises a flat ring shaped metal core and two ring shaped friction materials concentrically arranged on a top surface of the metal core at an interval. Each of the ring shaped friction materials has a plurality of circumferential grooves and a plurality of radial grooves for communicating from an inner edge or an outer edge of the flat ring shaped metal core to the circumferential grooves provided. Thereby, more lubricating oil can be introduced between the inner clutch plate and an outer clutch plate that is in frictional engagement therewith. A dynamic pressure thereof can improve an effect to separate the clutch plates from each other. As a result, a drag torque can be more effectively reduced.

PATENT DOCUMENT 1: Japanese Patent Laid-Open Publication No. 2003-090369
PATENT DOCUMENT 2: Japanese Patent Laid-Open Publication No. 2008-106929

DISCLOSURE OF THE INVENTION

Problems that the Invention is to Solve

In the techniques described in the patent documents 1 and 2, the groove formed to extend in a radial direction and the groove formed to extend in a circumferential direction are provided over an entire area of the friction material. Thereby, an area where the segment piece or the ring shaped friction material frictionally contacts with a separator plate or an outer clutch plate associated therewith, which is hereafter described as a "lining area", is significantly reduced. As a result, the inventions also have problems that torque transmission capacity in an engaged state cannot be sufficiently assured and heat resistance and peeling resistance decrease.

The present invention attempts to solve such problems. It is an object of the present invention to provide a wet friction material that is a segment friction material or a ring-type friction material and that further promotes discharge of lubricating oil in a disengaged state while maintaining a large lining area to such an extent that it does not affect torque transmission capacity, heat resistance, and peeling resistance and obtains an excellent effect to reduce a drag torque in a wide range of relative rotation speeds.

Means for Solving the Problem

A wet friction material according to the invention of claim 1 is a segment friction material wherein a plurality of segment pieces made by cutting a friction material substrate is joined on both surfaces along an entire circumference or on one surface along an entire circumference of a ring-shaped metal core with an adhesive at intervals so that oil grooves are formed in the interval. Or the wet friction material is a ring-type friction material wherein a ring shaped friction material substrate is joined on both surfaces along an entire circumference or on one surface along an entire circumference of a ring-shaped metal core with an adhesive and has a plurality of island shaped portions formed at intervals to form oil grooves in the intervals. In the wet friction material, a part with a drag torque reducing groove disposed and a part without the drag torque reducing groove disposed are provided on top surfaces of the plurality of the segment pieces or the island shaped portions in a direction crossing the oil groove over the entire circumference of the ring shape.

Here, in the ring-type friction material, the "interval part" is recessed and the island shaped portion is projected to frictionally contact with a counter material. A method for making a recess in the "interval part" to form the island shaped portion includes a method for forming it in a step of making the frictional material substrate into paper, press working, cutting work or the like and the cutting work further includes cutting work with a blade, cutting work by a laser beam or the like.

In addition, "a part with a drag torque reducing groove disposed and a part without the drag torque reducing groove disposed are provided" does not mean that the segment pieces or the island shaped portions provided on the ring-shaped metal core have the drag torque reducing groove over the entire circumference of the ring shape so that the drag torque reducing groove extend from an end to anther end of the segment piece or the island shaped portion in the direction crossing the oil groove. It means that each of the segment pieces or the island shaped portions provides a part with the drag torque reducing groove disposed thereon and a part without the drag torque reducing groove disposed thereon at least at one place for each or that the segment pieces or the island portions are constructed such that there is provided a portion in a circumferential direction of the ring shape where the drag torque reducing groove is not disposed over an entire area in a radial direction of the ring shape only by a part where the drag torque reducing groove is disposed or only by a part where the drag torque reducing groove is not disposed in the direction crossing the oil groove.

In other words, there are provided one or more parts without the drag torque reducing groove disposed on the top surface of the segment piece(s) or the island shaped portion(s) in the radial direction, when the segment friction material or the ring-type friction material is viewed over the entire circumference of the ring shape.

Moreover, at least one of the segment pieces or at least one of the island shaped portions preferably has the drag torque reducing groove formed to extend from one end face thereof facing the interval (oil groove) to the other end face facing the interval.

In a wet friction material according to the invention of claim 2, in the construction of claim 1, the drag torque reducing groove is provided at a plurality of places on the entire circumference of the ring shape of the segment friction material or at a plurality of places on the entire circumference of the ring shape of the ring-type friction material.

In a wet friction material according to the invention of claim 3, in the construction of claim 2, the drag toque reducing groove is provided on at least every other segment piece of the plurality of segment pieces or on at least every other island shaped portion of the plurality of island shaped portions.

In a wet friction material according to the invention of claim 4, in the construction of one of claim 1 to claim 3, the drag torque reducing groove is provided on two or more adjacent segment pieces or on two or more adjacent island shaped portions.

In a wet friction material according to the invention, in the construction of one of claim 2 to claim 4, centers of the plurality of drag torque reducing grooves formed on top surfaces of the segment pieces or the island portions are provided at positions where the circumference of the segment friction material is divided almost equally.

Here, "centers of the plurality of drag torque reducing grooves" means an intersection point of a center line in a width direction and a center line in a longitudinal direction of a drag torque reducing groove, which is provided on a segment piece or a island portion in an isolated manner in a sense that an segment piece or island portion adjacent to the segment piece or the island portion having such drag torque reducing groove has not drag torque reducing groove, and a center line in a longitudinal direction thereof, or an intersection point of a center line in a width direction and a center line in a longitudinal direction of a series of drag torque reducing grooves extending over two or more adjacent segment pieces or island portions.

In addition, "positions where the circumference is divided almost equally" mean positions at which, in case the drag torque reducing grooves are provided at two places, respective centers of the drag torque reducing grooves make an angle of approximately 180 degrees each other on the circumference in terms of a center of the circumference (center of the ring shape), positions at which, in case they are provided at three places, respective centers of the drag torque reducing grooves make an angle of approximately 120 degrees each other on the circumference in terms of a center of the circumference (center of the ring shape), positions at which, in case they are provided at four places, respective centers of the drag torque reducing grooves make an angle of approximately 90 degrees each other on the circumference in terms of a center of the circumference (center of the ring shape), and positions at which, in case they are provided at five places, respective centers of the drag torque reducing grooves make an angle of approximately 72 degrees each other on the circumference in terms of a center of the circumference (center of the ring shape), A width of the drag torque reducing groove is preferably within a range of 6% to 60% of a radial width of the segment piece or 6% to 60% of a radial width of the island shaped portion, more preferably within a range of 13% to 40%.

In addition, a depth of the drag toque reducing groove is preferably within a range of 10% to 70% of a thickness of the segment piece or the island shaped portion, more preferably within a range of 30% to 50%.

Effects of the Invention

The wet friction material according to the invention of claim 1 is the segment friction material wherein the plurality of segment pieces made by cutting the friction material substrate is joined on both surfaces along the entire circumference or on one surface along the entire circumference of the ring-shaped metal core with the adhesive at intervals so that the oil grooves are formed in the intervals. Or the wet friction material is the ring-type friction material wherein the ring shaped friction material substrate is joined on both surfaces along the entire circumference or on one surface along the entire circumference of the ring-shaped metal core with the adhesive and has the plurality of island shaped portions formed at intervals to form the oil grooves in the intervals. In the wet friction material, the part with the drag torque reducing groove disposed and the part without the drag torque reducing groove disposed are provided on the top surfaces of the plurality of segment pieces or on the top surfaces of the plurality of island shaped portions in the direction crossing the oil groove over the entire circumference of the ring shape.

With such structures, when a friction material clutch device such as a wet hydraulic clutch is disengaged in the case where the wet friction material and the counter material such as the separator plate relatively rotate, lubricating oil between them is discharged from the intervals (oil grooves) between the plurality of segment pieces or from the intervals (oil grooves) between the plurality of island shaped portions to an outer peripheral side. Moreover, the lubricating oil is discharged in the circumferential direction from the drag torque reducing groove formed in the direction crossing the oil groove provided on the top surface of the segment piece or on the top surface of the island shaped portion. And at the same time, a part of the lubricating oil runs over the drag torque reducing groove (overflows out of the drag torque reducing groove) provided on the top surface of the segment piece or on the top surface of the island shaped portion and is discharged therefrom while forming an oil film on the top surface of the wet friction material.

As a result, excess lubricating oil between the wet friction material and the counter material is efficiently discharged. Moreover, the wet friction material and the counter material certainly separate from each other by the oil film formed on the top surface of the wet friction material and a drag torque in a disengaged state is significantly reduced. In particular, when a relative rotation speed is high and the lubricating oil is unevenly distributed to the outer peripheral side by centrifugal force, an amount of the lubricating oil between the wet friction material and the counter material becomes smaller. In this case, the drag torque can be more effectively reduced. In addition, a decrease in lining area can be minimized, since the part with the drag torque reducing groove disposed and the part without the drag torque reducing groove disposed are provided on the top surface of the segment piece or on the top surface of the island shaped portion. Accordingly, an adverse effect due to a significant decrease in the lining area as in the techniques described in the patent documents 1 and 2 can be prevented from occurring.

Moreover, the lining area can be increased by reducing the number of the segment pieces or the island shaped portions while keeping the intervals between adjacent ones of the segment pieces or between adjacent ones of the island shaped portions at a predetermined size. Thereby, even if the drag torque reducing groove is provided on a part of the top surface of the segment piece or on a part of the top surface of the island shaped portion, a lining area equivalent to or greater than that of a conventional wet friction material can be assured. Accordingly, there is no adverse effect due to a decrease in lining area and a drag torque is certainly reduced by an action of the drag torque reducing groove provided on the top surface.

As described above, there is provided a wet friction material that further promotes discharge of lubricating oil in a disengaged state while maintaining a large lining area to such an extent that it does not affect torque transmission capacity, heat resistance, and peeling resistance and can obtain an excellent effect to reduce a drag torque in a wide range of relative rotation speeds.

In the wet friction material according to the invention of claim 2, the drag torque reducing groove is provided at the plurality of places on the entire circumference of the ring shape of the segment friction material or the ring-type friction material. Thus, in addition to the effects of the invention according to claim 1, an effect to separate the wet friction material and the counter material or an effect to discharge the lubricating oil by the drag torque reducing groove provided on the top surface is exhibited over the entire circumference of the wet friction material without localization. Thereby, a more stable effect to reduce a drag torque can be obtained.

Here, in "provided at the plurality of places on the entire circumference", three or more places on the circumference are especially preferable, since a more stable effect to reduce a drag torque can be certainly obtained.

In the wet friction material according to the invention of claim 3, the drag torque reducing groove is provided on at least every other segment piece of the plurality of segment pieces or on at least every other island shaped portion of the plurality of island shaped portions.

As a result, there is no excess lubricating oil between the wet friction material and the counter material and the wet friction material and the counter material certainly separate from each other. Thereby, a drag torque in a disengaged state is significantly reduced. In particular, when a relative rotation speed is high and the lubricating oil is unevenly distributed to an outer peripheral side by centrifugal force, an amount of the lubricating oil between the wet friction material and the counter material becomes smaller. In this case, a drag torque can be more effectively reduced. In addition, a decrease in lining area can be minimized, since the drag torque reducing groove provided on the top surface of the segment piece is provided only on a part of the plurality of segment pieces or the plurality of island shaped portions.

The wet friction material according to the invention of claim 4, the drag torque reducing groove is provided on two or more adjacent segment pieces or on two or more adjacent island shaped portions. Thus, in addition to the effects of the invention of one of claims 1 to 3, a greater effect to separate the wet friction material and the counter material and a greater effect to discharge the lubricating oil by the drag torque reducing groove provided on the top surface are exhibited. Thereby, a greater effect to reduce a drag torque can be obtained.

In the wet friction material according to the invention, the centers of the plurality of drag torque reducing grooves formed on the top surfaces of the segment pieces or the island shaped portions are provided at positions where the circumference of the segment friction material or the ring-type friction material is divided almost equally. Thus, in addition to the effects of the invention of claim 2 to claim 4, an effect to separate the wet friction material and the counter material by the drag torque reducing groove provided on the top surface is uniformly exhibited over the entire circumference of the wet friction material. Thereby, a further stable effect to reduce a drag torque can be obtained.

The width of the drag toque reducing groove is preferably within a range of 6% to 60% of the radial width of the segment piece or the island shaped portion, since both high torque transmission efficiency when the wet friction material is engaged and a low drag torque in a disengaged state can be certainly achieved.

More specifically, if the width of the drag torque reducing groove is less than 6% of the radial width of the segment piece or the island shaped portion, an effect to reduce a drag torque by providing the drag torque reducing groove on the top surface cannot be sufficiently obtained. On the other hand, if the width of the drag torque reducing groove is over 60% of the radial width of the segment piece or the island shaped portion, there is a decrease in contact area of the wet friction material and the counter material in an engaged state and it is hard to obtain high torque transmission efficiency sufficiently.

The width of the drag torque reducing groove is more preferably within a range of 13% to 40% of the radial width of the segment piece or the island shaped portion, since both high torque transmission efficiency when the wet friction material is engaged and a low drag torque in a disengaged state can be more certainly achieved.

In addition, the depth of the drag torque reducing groove is preferably within a range of 10% to 70% of the thickness of the segment piece or the island shaped portion, since the lubricating oil flows into the drag torque reducing groove provided on the top surface to make the lubricating oil overflow to the top surface of the segment piece or the island shaped portion around the drag torque reducing groove, so a clearance between the wet friction material and the counter material is assured and a situation where a drag toque increases can be certainly prevented.

More specifically, if the depth of the drag torque reducing groove provided on the top surface is less than 10% of the thickness of the segment piece or the island shaped portion, the lubricating oil is hard to flow into the drag torque reducing groove. On the other hand, if the depth of the drag torque reducing groove provided on the top surface is over 70% of the thickness of the segment piece or the island shaped portion, it serves as a normal oil groove and it is hard to obtain an effect to make the lubricating oil overflow to the top surface of the segment piece or the island shaped portion. Accordingly, the depth of the drag torque reducing groove provided on the top surface is preferably within a range of 10% to 70% of the thickness of the segment piece or the island shaped portion.

The depth of the drag toque reducing groove provided on the top surface is more preferably within a range of 30% to 50% of the thickness of the segment piece or the island shaped portion, since the lubricating oil more certainly flows into the drag torque reducing groove provided on the top surface and an effect to make the lubricating oil overflow to the top surface of the segment piece or the island shaped portion can be more certainly obtained.

As described above, the drag torque reducing groove has a function to smoothly discharge the lubricating oil when excess lubricating oil is present between the wet friction material and the counter material and has a function to supply the lubricating oil to the top surface of the wet friction material when the lubricating oil is small in amount in order to hold the separation between the wet friction material and the counter material at an appropriate interval.

BRIEF DESCRIPTION OF THE DRAWINGS

FIG. 1A is a plan view showing an entire structure of Comparative Example 1 of a segment friction material, and FIG. 1B is a plan view showing an entire structure of Comparative Example 2 of a segment friction material.

FIG. 2A is a plan view showing an entire structure of Comparative Example 3 of a segment friction material, and FIG. 2B is a partial plan view showing enlargement of a part thereof.

FIG. 8A is a plan view showing an entire structure of a segment friction material according to Working Example 4 of the first embodiment of the present invention, and FIG. 8B is a partial plan view showing enlargement of a part thereof.

FIG. 14A is a plan view showing an entire structure of a segment friction material according to Working Example 5 of the first embodiment of the present invention, and FIG. 14B is a partial plan view showing enlargement of a part thereof.

FIG. 21A is a plan view showing an entire structure of a ring-type friction material according to Working Example 9 of the second embodiment of the present invention, and FIG. 21B is a partial plan view showing enlargement of a part thereof.

Figure 3A:
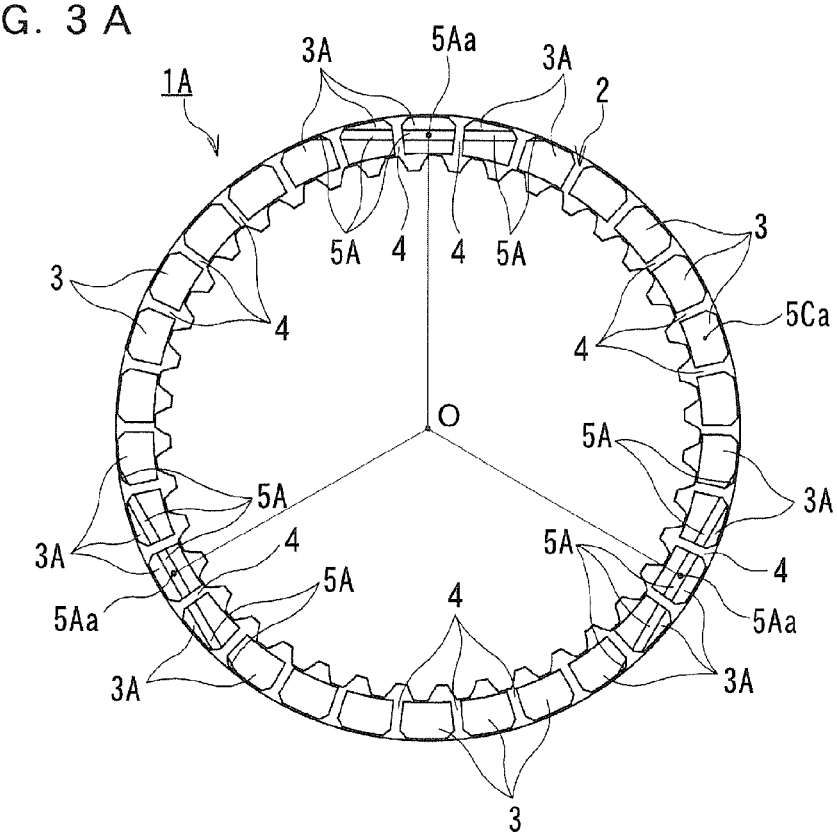
FIG. 3A is a plan view showing an entire structure of a segment friction material according to Working Example 1 of a first embodiment of the present invention.

EXPLANATION OF CODES 1A, 1B, 1C, 1D, 1E, 1F, 1G, 1H, 1J, 1K, 1L, 1M, 1N, 1P, 1Q, 21A, 21B, 21C, 21D: segment friction material
2: metal core
3, 3A, 3B, 3C, 3D, 3E, 3F, 3G, 3H, 3J, 3K, 3L, 3M, 3N, 3P, 3Q: segment piece
4, 24: interval (oil groove)
5, 5A, 5B, 5C, 5D, 5E, 5F, 5G, 5H, 5J, 5K, 5L, 5M, 5N, 5P, 5Q, 25A, 25B, 25C, 25D: drag torque reducing groove
23, 23A, 23B, 23C, 23D: island shaped portion
26A, 26B, 23C, 26D: ring shaped friction material substrate

DETAILED DESCRIPTION OF PREFERRED EMBODIMENTS

A preferred embodiment of the present invention is described hereafter based on drawings. In each of embodiments, a same mark and a same code shown in the drawings mean the same or equivalent function parts, and overlapped explanation thereof will be omitted here.

In order to practice a wet friction material according to the present invention, a ring-shaped metal core and segment pieces made by cutting a friction material substrate or a ring shaped friction material substrate stuck on the metal core are needed. A material of the metal core is not limited to metal, but it is preferably made of metal from the view point of strength, heat resistance or the like and especially preferable to be an iron-based material such as steel. As a shape of the metal core, a ring shape having corrugation which is not flat or the like, including a flat ring shape may be used. A size of the ring shape of the metal core (inner diameter and outer diameter) may be arbitrarily arranged depending on a size of a counter material such as a separator plate to make friction contact.

As the friction material substrate, one comprising a papermaking body having a fiber component and a filler component impregnated with a thermosetting resin, heated, and cured is generally used. Here, as the fiber component, an aramid fiber, a cellulose fiber, a glass fiber, a carbon fiber or the like may be used alone or in combination. In particular, a combination of the cellulose fiber (pulp) and the aramid fiber is preferably used. As the filler component, calcium carbonate, barium sulfate, calcium sulfate, zinc oxide, titanium oxide, talc, diatom earth, clay, mica or the like may be used alone or in combination.

As the thermosetting resin, an epoxy resin, a phenolic resin, a polyurethane resin, a melamine resin, an urea resin, an unsaturated polyester resin, an alkyd resin or the like may be used alone or in combination. In particular, the epoxy resin or the phenolic resin is preferably used, since they are easily available and low in cost.

As a method for cutting the friction material substrate into a segment piece shape or into a ring shape, a method such as cutting with a blade, cutting by use of a laser beam, and punching may be used. As a method for sticking obtained segment pieces or an obtained ring shaped friction material substrate on the metal core, a method such as bonding with an adhesive may be used. Here, as the adhesive, a thermosetting resin such as a phenolic resin is preferably used.

A method for forming an island shaped portion on the ring shaped friction material substrate may include press working, cutting work or the like and the cutting work further includes cutting work with a blade, cutting work by a laser beam or the like. In addition, the number of island shaped portions formed on the ring shaped friction material substrate or the number of segment pieces stuck on one surface of the metal core may be arbitrarily arranged depending on required friction characteristics or the like.

In order to practice the present invention, it is necessary to provide a drag torque reducing groove only on a part of top surfaces of the plurality of segment pieces or the plurality of island shaped portions. A method for providing the drag torque reducing groove includes press working, cutting work or the like and the cutting work further includes cutting work with a blade, cutting work by a laser beam or the like. Timing of providing the drag torque reducing groove may be when a friction material substrate is made into paper, before or after cutting a produced friction material substrate, or after sticking it on the metal core.

A preferred embodiment of the present invention and a specific Working Example are hereafter described referring to drawings.

[First Embodiment]

First, Comparative Example of a wet friction material related to a first embodiment of the present invention is described referring to FIGS. 1 and 2 and a wet friction material according to the first embodiment of the present invention is described referring to FIGS. 3 to 13. Among wet friction materials according to the present invention, the first embodiment relates to a segment friction material wherein a plurality of segment pieces made by cutting a friction material substrate is stuck on both surfaces along an entire circumference of a ring-shaped metal core at intervals.

FIGS. 1 and 2 are plan views showing structures of Comparative Examples 1, 2, and 3 of segment friction materials related to the segment friction material according to the first embodiment of the present invention.

As shown in FIG. 1A, the Comparative Example 1 of a segment friction material 11A comprises a metal core 2 having a flat ring shape and made of an iron material and segment pieces 13A. Forty segment pieces 13A are stuck on each of both surfaces along an entire circumference of the metal core 2 at an interval 14A to be a flow passage of ATF. An outer diameter Φ of the metal core 2 is 181 mm, a thickness of the metal core 2 is 0.8 mm, an outer diameter Φ1 between the segment pieces 13A facing each other is 180 mm, and an inner diameter χ2 is 165 mm.

In addition, a circumferential width (length in a horizontal direction) of the segment piece 13A is 11.5mm, a radial width (length in a vertical direction) is 7.5 mm, a thickness of the segment piece 13A is 0.4 mm, and a width of the interval 14A (oil groove) is 2 mm. Each of right and left outer peripheral corner portions of the segment piece 13A forms a C face 13Aa. More specifically, each of the right and left outer peripheral corner portions of the segment piece 13A is chamfered.

On the other hand, as shown in FIG. 1B, the Comparative Example 2 of a segment friction material 11B comprises a metal core 2 having a flat ring shape and segment pieces 13B. Thirty segment pieces 13B are stuck on each of both surfaces along an entire circumference of the metal core 2 at an interval 14B to be a flow passage of ATF. A width of the interval (oil groove) 14B is 2 mm which is the same as the interval 14A. Thereby, a circumferential width (length in a horizontal direction) of the segment piece 13B increases to 16 mm by reducing the number of the segment pieces 13B from forty to thirty as described above.

A radial width (length in a vertical direction) of the segment piece 13B is 7.5 mm which is the same as the segment piece 13A. In addition, each of right and left outer peripheral corner portions of the segment piece 13B also forms a C face 13Ba. More specifically, each of the right and left outer peripheral corner portions of the segment piece 13B is chamfered.

As a result, as will be described hereafter, the Comparative Example 2 of the segment friction material 11B has a large lining area as compared with the Comparative Example 1 of the segment friction material 11A. However, the number of the intervals 14B to be a flow passage of ATF decreases from forty to thirty. Thereby, a drag torque in a disengaged state increases.

On the other hand, as shown in FIG. 2A, the Comparative Example 3 of a segment friction material 11C comprises a metal core 2 having a flat ring shape and segment pieces 13C each having a groove 15 provided on a top surface thereof along a circumferential direction. Thirty segment pieces 13C are stuck on each of both surfaces along an entire circumference of the metal core 2 at an interval 14C to be a flow passage of ATF. A width of the interval (oil groove) 14C is 2 mm which is the same as the interval 14A, 14B and the segment piece 13C has a circumferential width of 16 mm and a radial width of 7.5 mm which are the same as the segment piece 13B.

As shown in FIG. 2B, a width of the groove 15 is 2 mm. In addition, each of right and left outer peripheral corner portions of the segment piece 13C also forms a C face 13Ca. More specifically, each of the right and left outer peripheral corner portions of the segment piece 13C is chamfered.

In such a segment friction material 11C, ATF is discharged from the interval (oil groove) 14C and ATF is discharged from the groove 15 along the circumferential direction. Moreover, a part of ATF runs over the groove 15 to form an oil film on the top surface of the segment piece 13C.

As a result, as will be described hereafter, the Comparative Example 3 of the segment friction material 11C has a reduced drag torque in a disengaged state as compared with the Comparative Example 1 of the segment friction material 11A. However, an area in contact with a counter material decreases by an area of the groove 15. Thereby, a lining area decreases.

As compared with the Comparative Examples 1 to 3 of the segment friction materials having such structures, a structure of a segment friction material as a wet friction material according to the first embodiment is described referring to FIGS. 3 to 8.

Figure 3B:
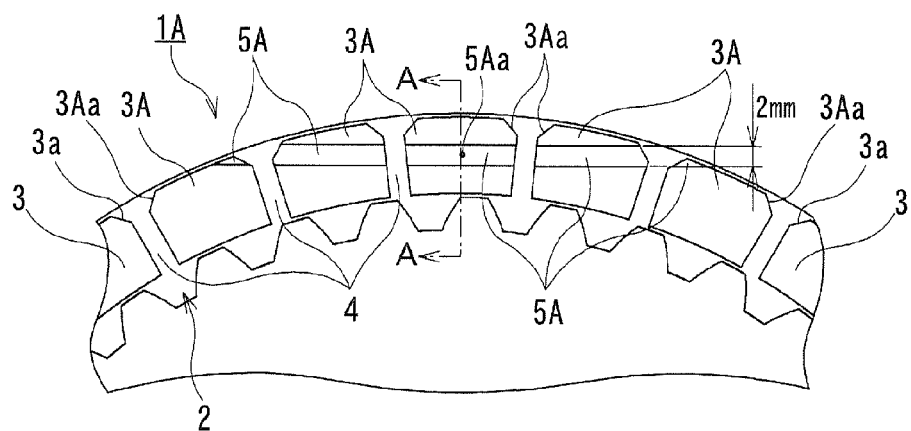
FIG. 3B is a partial plan view showing enlargement of a part thereof.

As shown in FIG. 3A, a segment friction material 1A according to Working Example 1 of the first embodiment comprises a metal core 2 having a flat ring shape and segment pieces 3, 3A. A total of thirty pieces of segment pieces 3, 3A are stuck on each of both surfaces along an entire circumference of the metal core 2 at an interval 4 to be a flow passage of ATF. A circumferential width (length in a horizontal direction) of the segment piece 3, 3A is 16 mm, a radial width (length in a vertical direction) is 7.5 mm, a thickness of the segment piece 3, 3A is 0.4 mm, and a width of the interval 4 (oil groove) is 2 mm. In addition, as shown in FIG. 3B, right and left outer peripheral corner portions of the segment piece 3, 3A form a C face 3a and a C face 3Aa. More specifically, the right and left outer peripheral corner portions of the segment piece 3, 3A are chamfered.

The segment pieces 3, 3A were produced by punching a friction material substrate into a predetermined shape shown in FIGS. 3A and 3B. The friction material substrate is made by impregnating a papermaking body having a fiber component and a filler component with a thermosetting resin, heating, and curing. Here, as the fiber, an aramid fiber and pulp were used. As the filler, diatom earth, graphite, and a carbon fiber were used. In addition, as the thermosetting resin, a phenolic resin is used. A segment piece according to each of the following Working Examples is produced in the same manner, too. The segment pieces 3, 3A thus produced are stuck on both surfaces of the metal core 2 with a thermosetting resin as an adhesive.

The segment friction material 1A according to the Working Example 1 is distinguished from the Comparative Examples 1 to 3 of the segment friction materials in the following respects. The thirty segment pieces are composed of two construction components comprising the segment piece 3 and the segment piece 3A. The segment piece 3A, which is one of the construction components, is arranged in five pieces adjacent to each other in a row. A drag torque reducing groove is provided only on the top surface of the segment piece 3A. Moreover, a series of drag torque reducing grooves 5A is provided over five pieces of segment pieces 3A. The series of drag torque reducing grooves 5A cross the interval (oil groove) 4 along a direction almost at right angles to a straight line connecting a center point 5Aa thereof and a center O of a circumference of the segment pieces 3, 3A stuck along the ring shape (which is also a center of the ring-shaped metal core 2). They are provided at three places on the circumference of the segment friction material 1A. As shown in FIG. 3B, the drag torque reducing groove 5A has a width of 2 mm and a depth of 0.15 mm.

The drag torque reducing groove 5A is formed by press working after sticking thirty segment pieces 3 on each of both surfaces of the metal core 2, and heating and curing a thermosetting resin (phenolic resin) as an adhesive. The segment piece 3 having the drag torque reducing groove 5A formed thereon becomes the segment piece 3A to constitute one of the construction components. A drag torque reducing groove according to each of the following Working Examples is formed in the same manner, too.

In addition, center points 5Aa of the series of drag torque reducing grooves 5A provided at the three places on the circumference and each extending over the segment pieces 3A arranged in five pieces are located at positions on the circumference that make an angle of approximately 120 degrees each other with the center O of the circumference. More specifically, the series of drag torque reducing grooves 5A provided at the three places are provided at positions where the circumference of the segment friction material 1A is divided almost equally.

As described above, in the segment friction material 1A according to the Working Example 1 of the first embodiment, the drag torque reducing groove 5A is provided on the top surfaces of the segment pieces 3A arranged in five pieces to extend over an entire area in a width direction of three pieces at a middle thereof and on a part in a width direction of two pieces at opposite sides thereof. Accordingly, a part of the two pieces at opposite sides of the segment pieces 3A and the segment piece 3 have no drag torque reducing groove 5A provided thereon.

Figure 4A:
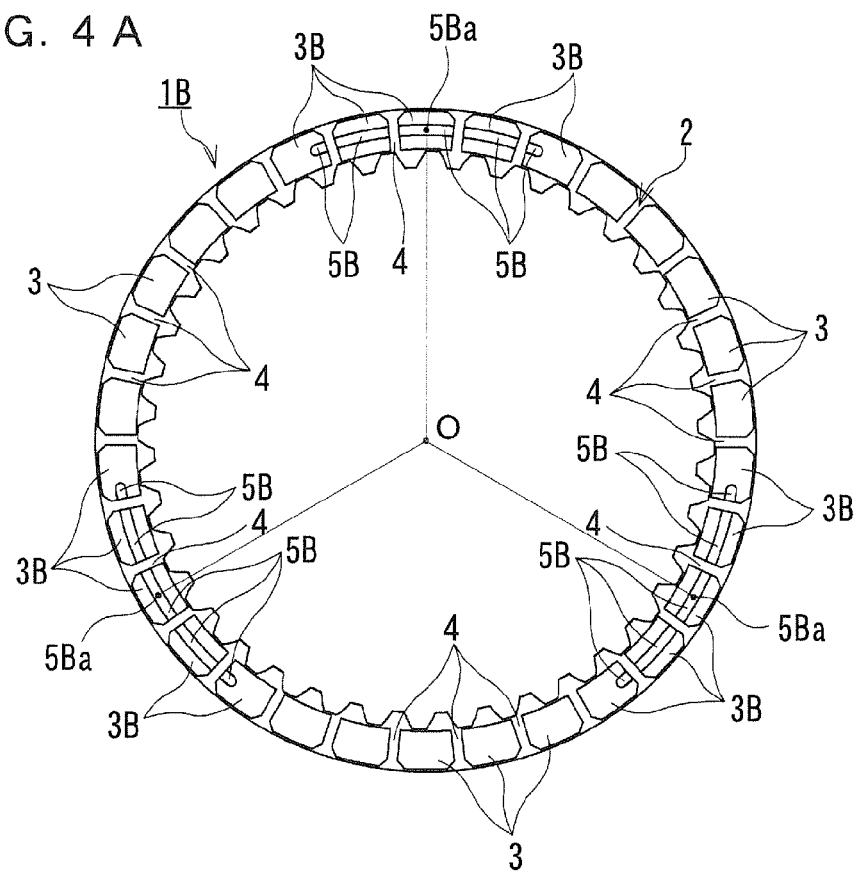
FIG. 4A is a plan view showing an entire structure of a segment friction material according to Working Example 2 of the first embodiment of the present invention.
Figure 4B:
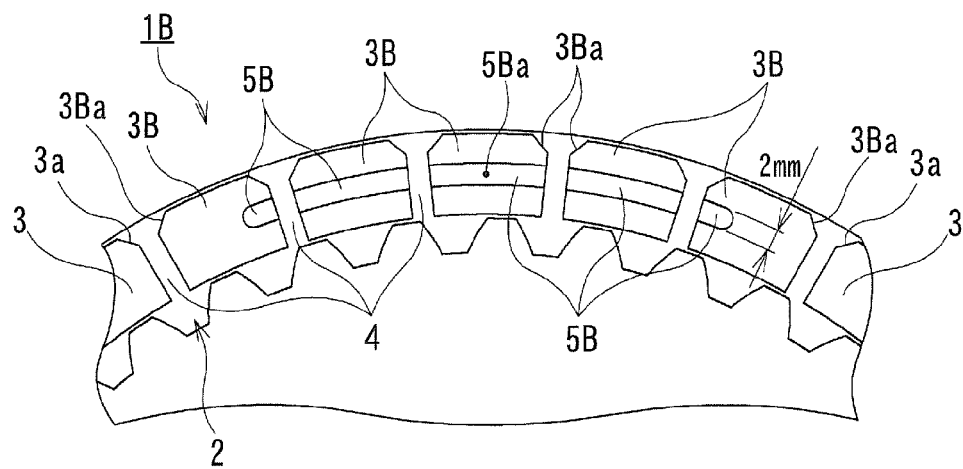
FIG. 4B is a partial plan view showing enlargement of a part thereof.

Next, as shown in FIG. 4A, a segment friction material 1B according to Working Example 2 of the first embodiment comprises a metal core 2 having a flat ring shape and segment pieces 3, 3B. A total of thirty pieces of segment pieces 3, 3B are stuck on each of both surfaces along an entire circumference of the metal core 2 at an interval 4 to be a flow passage of ATF. A circumferential width of the segment piece 3 , 3B is 16 mm, a radial width is 7.5 mm, a thickness of the segment piece 3 , 3B is 0.8 mm, and a width of the interval (oil groove) 4 is 2 mm. In addition, as shown in FIG. 4B, right and left outer peripheral corner portions of the segment piece 3 , 3B form a C face 3a and a C face 3Ba. More specifically, the right and left outer peripheral corner portions of the segment piece 3 , 3B are chamfered.

The segment friction material 1B according to the Working Example 2 is distinguished from the segment friction material 1A according to the Working Example 1 in the following respect. Instead of the drag torque reducing groove along the direction almost at right angles to the straight line connecting the center point 5Aa of the series of drag torque reducing grooves 5A and the center O of the circumference, a series of drag torque reducing grooves 5B that crosses the interval (oil groove) 4 along a circumferential direction is provided only on a part of top surfaces of the segment pieces 3B among the thirty pieces of segment pieces 3, 3B. They are provided at three places on a circumference of the segment friction material 1B. As shown in FIG. 4B, the drag torque reducing groove 5B has a width of 2 mm and a depth of 0.15 mm.

As described above, the segment friction material 1B according to the Working Example 2 also comprises the drag torque reducing groove 5B that is provided only on the segment piece 3B and not provided on the segment piece 3 as in the segment friction material 1A according to the Working Example 1. Thereby, a part with the drag torque reducing groove 5B disposed thereon and a part without the drag torque reducing groove 5B disposed thereon are provided over the entire circumference of the ring shape.

Center points 5Ba of the series of drag torque reducing grooves 5B, which are provided at the three places on the circumference and each of which extends over the segment pieces 3B arranged in five pieces, are located at positions on the circumference that make an angle of approximately 120 degrees each other with the center O of the circumference. More specifically, the series of drag torque reducing grooves 5B provided at the three places are located at positions where the circumference of the segment friction material 1B is divided almost equally.

Figure 5:
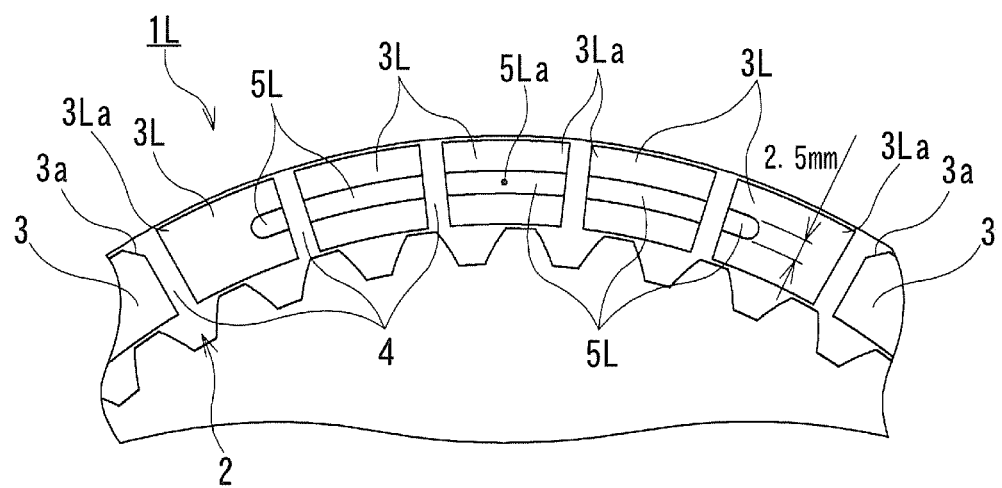
FIG. 5 is a partial plan view showing enlargement of a part of a segment friction material according to a modified example of the Working Example 2 of the first embodiment of the present invention.

FIG. 5 shows a modified example of the Working Example 2 wherein a segment friction material 1L does not comprise a drag torque reducing groove along a direction almost at right angles to a straight line (in a radical direction) connecting a center point 5La of a series of drag torque reducing groove 5L and a center O of a circumference (see FIG. 4A). It comprises thirty pieces of segment pieces 3, 3L and a series of drag torque reducing grooves 5L provided to cross an interval (oil groove) 4 along a circumferential direction. The series of drag torque reducing grooves 5L are provided at three places on a circumference of the segment friction material 1L only on a part of top surfaces of the segment pieces 3L among the thirty pieces of segment pieces 3, 3L. As shown in FIG. 5, the drag torque reducing groove 5L has a width of 2.5 mm and a depth of 0. 1 mm. Each of right and left outer peripheral corner portions of the segment piece 3C forms a corner potion 3La which is not chamfered.

It is the same as the Working Example 2, except the width of the drag torque reducing groove 5L and except that each of the right and left outer peripheral corner portions of the segment piece 3C are not chamfered.

As described above, each of right and left outer peripheral corner portions of the segment piece 3L may have a structure which is not chamfered. In this modified example, each of the right and left outer peripheral corner portions 3La of the segment piece 3L has a structure which is not chamfered and each of right and left outer peripheral corner portions 3a of the segment piece 3 has a structure which is chamfered. Naturally, each of the right and left outer peripheral corner portions 3La of the segment piece 3L and each of the right and left outer peripheral corner portions 3a of the segment piece 3 may have a chamfered structure in the same manner and may also have a structure which is not chamfered.

Figure 6:
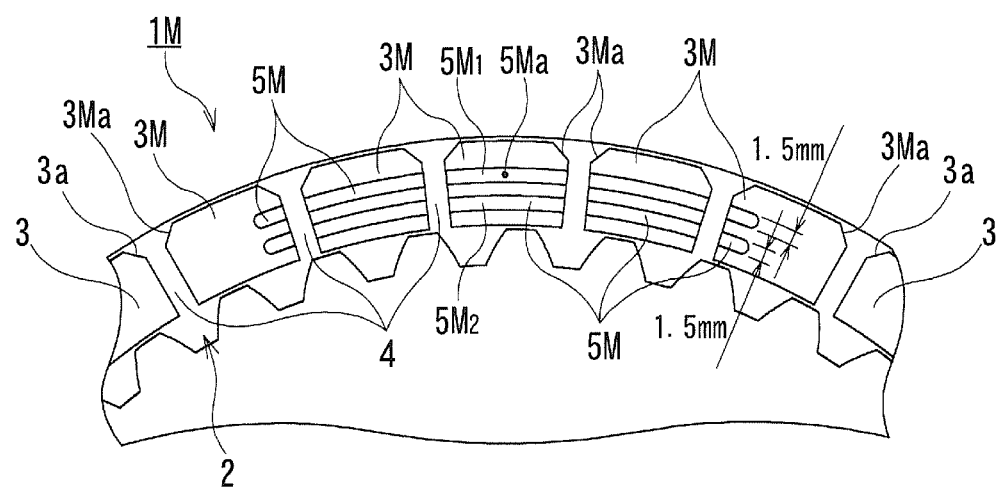
FIG. 6 is a partial plan view showing enlargement of a part of a segment friction material according to another modified example of the Working Example 2 of the first embodiment of the present invention.

FIG. 6 shows another modified example of the Working Example 2 wherein a segment friction material 1M comprises thirty pieces of segment pieces 3, 3M and a series of drag torque reducing grooves 5M, which is arranged in two rows. The series of drag torque reducing grooves 5M are provided to cross an interval (oil groove) 4 along a circumferential direction at three places on a circumference of the segment friction material 1M. They are provided on a part of top surfaces of the segment pieces 3M among the thirty pieces of segment pieces 3, 3M. As shown in FIG. 6, each of the two rows of drag torque reducing grooves 5M has a width of 1.5 mm, a clearance between them is 1.5 mm, and a depth is 0.1 mm. Each of right and left outer peripheral corner portions of the segment piece 3M forms a corner portion 3Ma which is chamfered.

More specifically, the segment piece 3M has the two rows of drag torque reducing grooves 5M composed of an outer drag torque reducing groove 5M1 and an inner drag torque reducing groove 5M2. Naturally, the drag torque reducing groove 5M may be composed of two or more rows of outer drag torque reducing grooves, too. In particular, other modified example of the Working Example 2 comprises a plurality of rows of drag torque reducing grooves that may be arbitrarily arranged in the number thereof. It is the same as the Working Example 2, except for a shape of the drag torque reducing groove 5M.

Figure 7A:
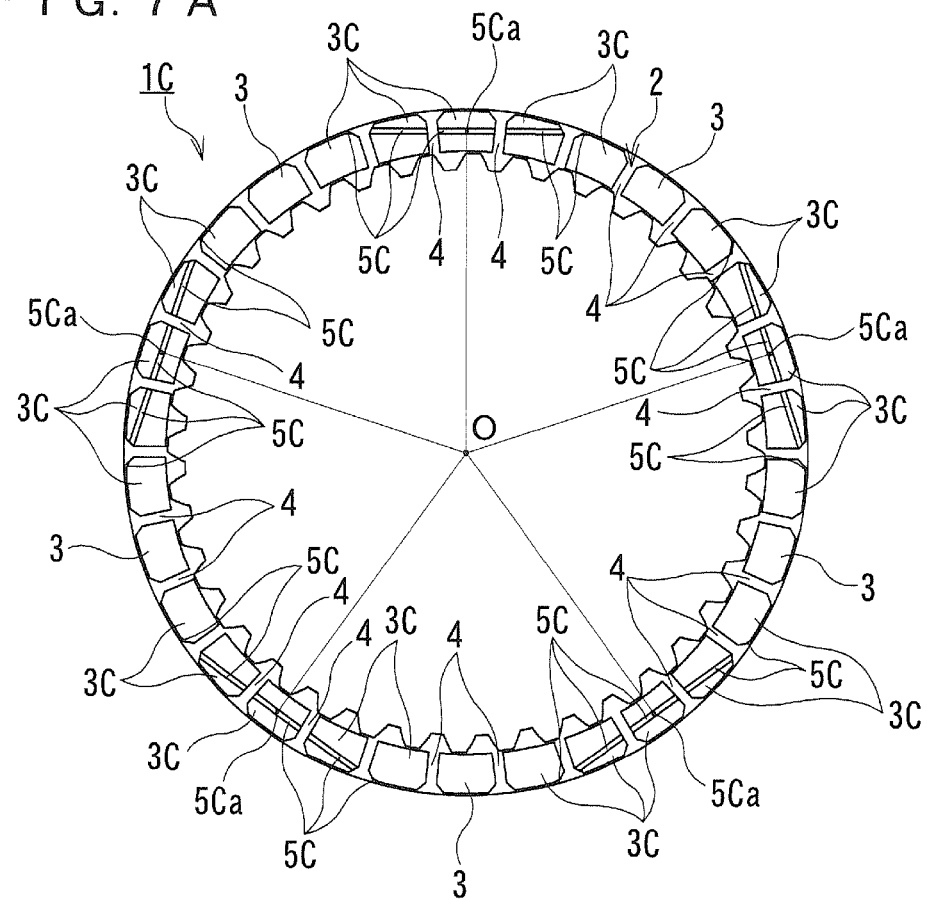
FIG. 7A is a plan view showing an entire structure of a segment friction material according to Working Example 3 of the first embodiment of the present invention.
Figure 7B:
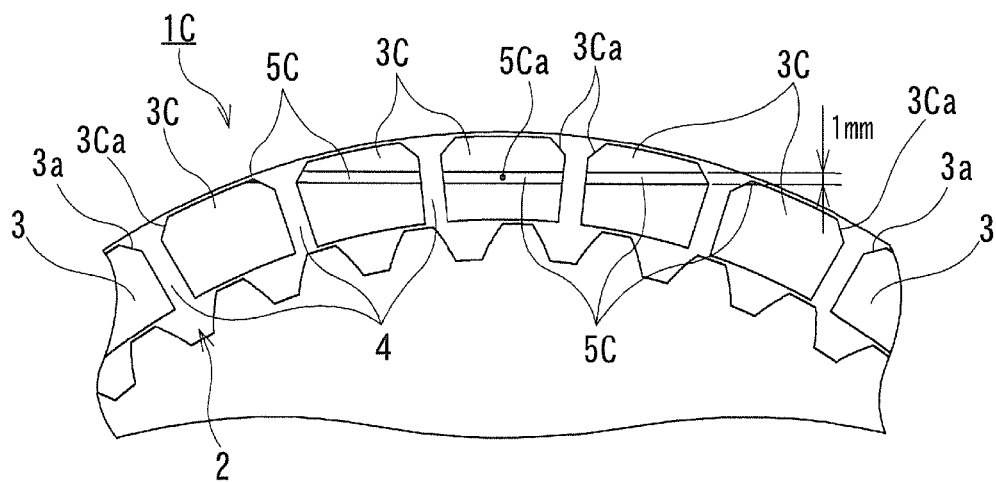
FIG. 7B is a partial plan view showing enlargement of a part thereof.

As shown in FIG. 7A, a segment friction material 1C according to Working Example 3 of the first embodiment comprises a metal core 2 having a flat ring shape and segment pieces 3, 3C. A total of thirty pieces of segment pieces 3, 3C are stuck on each of both surfaces along an entire circumference of the metal core 2 at an interval 4 to be a flow passage of ATF. A circumferential width of the segment piece 3, 3C is 16 mm, a radial width is 7.5 mm, a thickness of the segment piece 3, 3C is 0.8 mm, and a width of the interval (oil groove) 4 is 2 mm. In addition, as shown in FIG. 7B, right and left outer peripheral corner portions of the segment piece 3, 3C form a C face 3a and a C face 3Ca. More specifically, the right and left outer peripheral corner portions of the segment piece 3, 3C are chamfered.

The segment friction material 1C according to the Working Example 3 is distinguished from the segment friction material 1A according to the Working Example 1 in the following respects. A series of drag torque reducing grooves 5C is provided to extend along a direction almost at right angles to a straight line connecting a center point 5Ca thereof and a center O of a circumference. The series of drag torque reducing grooves 5C are provided at five places, not at three places on the circumference of the segment friction material 1C. They are provided only on top surfaces of the segment pieces 3C among the thirty pieces of segment pieces 3, 3C. In addition, as shown in FIG. 7B, the drag torque reducing groove 5C has a width of 1 mm which is narrower than that of the drag torque reducing groove 5A of the segment friction material 1A. That is, the grove width of the drag torque reducing groove 5C is reduced by an increase in the number of places where the drag torque reducing groove was set. In addition, the drag torque reducing groove 5C has a depth of 0.15 mm.

As shown in FIG. 7A, center points 5Ca of the series of drag torque reducing grooves 5C, which are provided at the five places on the circumference to each extend over the segment pieces 3C arranged in five pieces, are located at positions on the circumference that make an angle of approximately 72 degrees each other with the center O of the circumference. More specifically, the series of drag torque reducing grooves 5C disposed at the five places are provided at positions where the circumference of the segment friction material 1C is divided almost equally.

As described above, the segment friction material 1C according to the Working Example 3 comprises the series of drag torque reducing grooves 5C provided more by two places on the circumference of the ring shape compared to the Working Example 1. However, the drag torque reducing groove 5C is not provided in the segment piece 3 and a part of two pieces at opposite sides of the five pieces of the segment pieces 3C constituting the series of drag torque reducing grooves 5C. Thereby, there is a part or parts without the drag torque reducing groove 5C disposed in the entire circumference of the ring shape. Here, the part(s) without the drag torque reducing groove 5C decrease(s) in terms of the entire circumference of the ring shape compared to the Working Example 1. Thus, decrease in a lining area or a friction surface on the entire circumference of the segment friction material 1C can be controlled by reducing the groove width of the drag torque reducing groove 5C as described above.

As shown in FIG. 8A, a segment friction material 1D according to Working Example 4 of the first embodiment comprises a metal core 2 having a flat ring shape and segment pieces 3, 3D. A total of thirty pieces of segment pieces 3, 3D are stuck on each of both surfaces along an entire circumference of the metal core 2 at an interval 4 to be a flow passage of ATF. A circumferential width of the segment piece 3, 3D is 16 mm, a radial width is 7.5 mm, a thickness of the segment piece 3, 3D is 0.8 mm, and a width of the interval (oil groove) 4 is 2 mm. In addition, as shown in FIG. 8B, right and left outer peripheral corner portions of the segment piece 3, 3D form a C face 3a and a C face 3Da. More specifically, the right and left outer peripheral corner portions of the segment piece 3, 3D are chamfered.

The segment friction material 1D according to the Working Example 4 is distinguished from the segment friction material 1C according to the Working Example 3 in the following respect. Instead of the drag torque reducing groove along the direction almost at right angles to the straight line connecting the center point 5Ca of the series of drag torque reducing grooves 5C and the center O of the circumference, a series of drag torque reducing grooves 5D is provided to extend along a circumferential direction at five places on a circumference of the segment friction material 1D. A series of drag torque reducing grooves 5D are only on top surfaces of the segment pieces 3D among the thirty pieces of segment pieces 3, 3D. As shown in FIG. 8B, a width of the drag torque reducing groove 5D is 1 mm and a depth of the drag torque reducing groove 5D is 0.15 mm.

Center points 5Da of the series of drag torque reducing grooves 5D, which are provided at the five places on the circumference and each of which extends over the segment pieces 3D arranged in five pieces, are located at positions on the circumference that make an angle of approximately 72 degrees each other with the center O of the circumference. More specifically, the series of drag torque reducing grooves 5D disposed at the five places are provided at positions where the circumference of the segment friction material 1D is divided almost equally.

As described above, the segment friction material 1D according to the Working Example 4 is distinguished from the segment friction material 1C according to the Working Example 3 in a circumferential shape of the drag torque reducing groove 5D. It is the same as the Working Example 3 with respect to a part with the drag torque reducing groove 5D disposed thereon and a part without the drag torque reducing groove 5D disposed thereon in the entire circumference of the ring shape.

The segment friction materials 1A, 1B, 1C, and 1D as the wet friction material according to the Working Examples 1 to 4 of the first embodiment were tested to examine a relationship between a relative rotation speed and a drag torque as compared with the Comparative Examples 1 to 3 of the segment friction materials 11A, 11B, and 11C.

The test was conducted under the conditions as follows. A relative rotation speed was 500 rpm to 5000 rpm. An oil temperature of ATF was 40 degrees centigrade. An oil amount of ATF was 2000 mL per minute (shaft center lubrication). As for a disc size, an outer circumference Φ1 and an inner circumference Φ2 shown in FIG. 1A were 180 mm and 165 mm. The number of the discs was three (thus, the number of steel discs (separator plates) as a counter member was four) and a pack clearance was 0.25 mm per plate.

The test was conducted in twice separately only on the Comparative Examples 1 to 3 of the segment friction materials 11A, 11B, and 11C and on the segment friction materials 1A, 1B, 1C, and 1D according to the Working Examples 1 to 4 and the Comparative Examples 1 and 3 of the segment friction materials 11A and 11C. The results of the test are shown in FIGS. 9 and 10.

Figure 9:
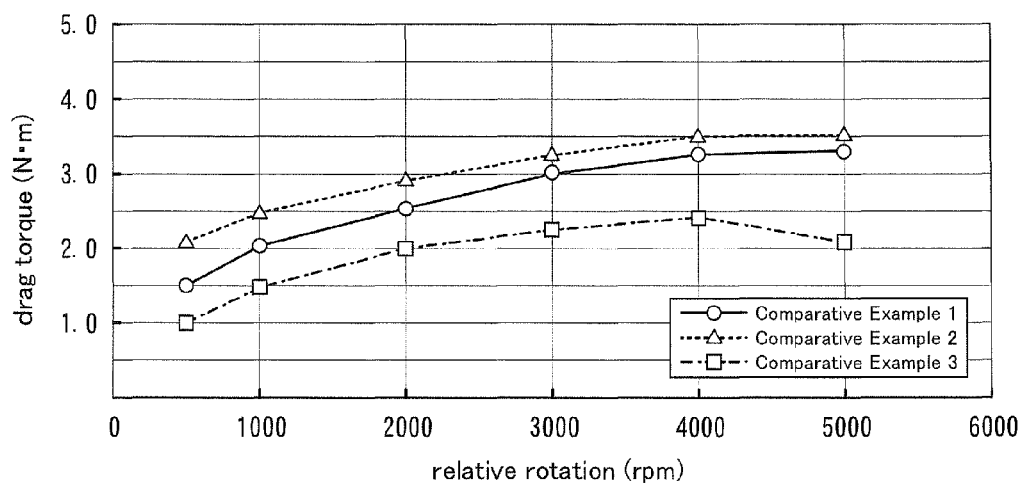
FIG. 9 is a graph showing a comparison of a relation between a relative rotation speed and a drag torque in the Comparative Examples 1, 2, and 3 of the segment friction materials.
Figure 10:
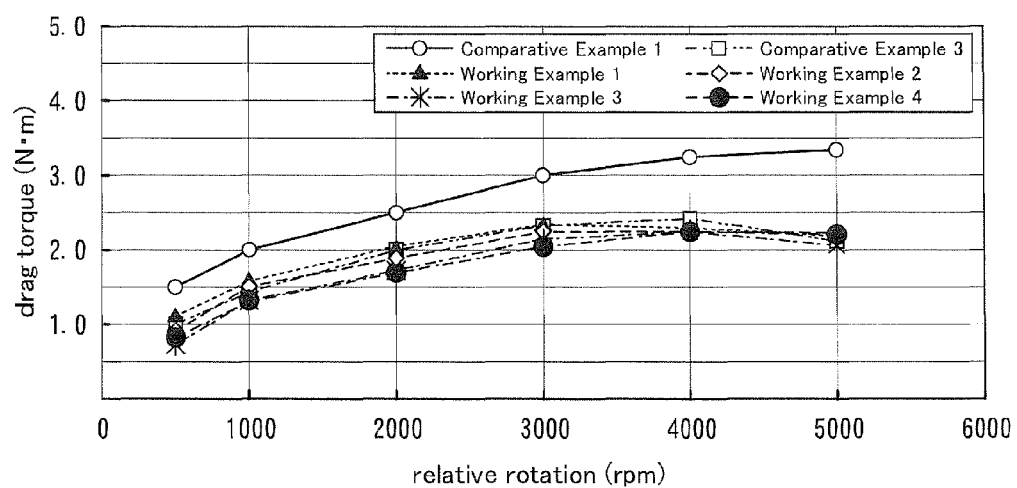
FIG. 10 is a graph showing a relation between a relative rotation speed and a drag torque in the segment friction materials (Working Examples 1 to 4) as the wet friction material according to the first embodiment of the present invention as compared with the Comparative Examples 1 and 3 of the segment friction materials.

First, as shown in FIG. 9, the Comparative Example 2 of the segment friction material 11B has a high drag torque in a whole range of relative rotation speeds from a low-speed range (500 rpm or more) to a high-speed range (5000 rpm or less) as compared with the Comparative Example 1 of the segment friction material 11A. It is assumed that as will be seen by comparing FIG. 1A to FIG. 1B, the Comparative Example 2 of the segment friction material 11B has a small number of intervals 14B to be a flow passage of ATF as compared with the Comparative Example 1 of the segment friction material 11A, thereby being low in discharging performance of ATF supplied through a shaft center toward an outer periphery.

On the other hand, as shown in FIG. 9, the Comparative Example 3 of the segment friction material 11C has a significant low drag torque in a whole range of relative rotation speeds from the low-speed range (500 rpm or more) to the high-speed range (5000 rpm or less) as compared with the Comparative Example 1 of the segment friction material 11A. It is assumed that discharge of ATF is further promoted by an action of the groove 15 provided on all the top surfaces of the segment pieces 13C arranged in thirty pieces on each surface of the Comparative Example 3 of the segment friction material 11C as shown in FIGS. 2A and 2B, and a part of ATF which ran over the groove 15 forms an oil film on the top surface of the segment piece 13C.

The Comparative Example 3 of the segment friction material 11C having such a low drag torque in a disengaged state also has a problem that a lining area is small. Lining areas of the Comparative Examples 1 to 3 of the segment friction materials 11A, 11B, and 11C are shown in TABLE 1 as compared with the segment friction materials 1A, 1B, 1C, and 1D according to the Working Examples 1 to 4 of the first embodiment.

TABLE 1

|  | Ratio of lining area |
| --- | --- |
| Comparative Example 1 | 100% |
| Comparative Example 2 | 107% |
| Comparative Example 3 | 86% |
| Working Example 1 | 101% |
| Working Example 2 | 100% |
| Working Example 3 | 102% |
| Working Example 4 | 100% |

TABLE 1 shows, in case a lining area of the Comparative Example 1 of the segment friction material 11A is set at 100%, each of lining areas of other segment friction materials as an area ratio. As shown in TABLE 1, the Comparative Example 2 of the segment friction material 11B has a large lining area and a ratio thereof is 107%, since the number of the intervals 14B is small. On the other hand, the Comparative Example 3 of the segment friction material 11C has a small lining area and a ratio thereof is 86%, since the groove 15 is provided on all the top surfaces of the segment pieces 13C arranged in thirty pieces on each surface.

The Comparative Example 3 of the segment friction material 11C having such a small lining area has problems that torque transmission capacity in an engaged state may not be sufficiently assured and heat resistance and peeling resistance may decrease according to circumstances.

In contrast, as shown in TABLE 1, ratios of lining areas of the segment friction materials 1A, 1B, 1C, and 1D according to the Working Examples 1 to 4 are 101%, 100%, 102%, and 100%, respectively, which are almost same as the lining area of the Comparative Example 1 of the segment friction material 11A. This is a result of providing the drag torque reducing grooves 5A, 5B, 5C, and 5D only on a part of the segment pieces 3, 3A, 3B, 3C, and 3D arranged in thirty pieces on each surface. Accordingly, the segment friction materials 1A, 1B, 1C, and 1D according to the Working Examples 1 to 4 have no problem resulting from a small lining area as those described above.

As shown in FIG. 10, the segment friction materials 1A, 1B, 1C, and 1D according to the Working Examples 1 to 4 have a significant low drag torque in a whole range of relative rotation speeds from a low-speed range (500 rpm or more) to a high-speed range (5000 rpm or less) as compared with the Comparative Example 1 of the segment friction material 11A. As described above, it was found that an effect to significantly reduce a drag torque in a disengaged state was produced by an action of the drag torque reducing grooves 5A, 5B, 5C, and 5D provided only on a part of the segment pieces 3, 3A, 3B, 3C, and 3D arranged in thirty pieces on each surface.

This effect may be obtained as follows. When ATF flowing through the oil groove provided in the radial direction of the ring shape flows into a new discharge passage provided on a part of oil grooves along a direction crossing the oil groove, namely along a direction almost at right angles to the straight line connecting the center point of the series of drag torque reducing grooves and the center of the circumference or along the circumferential direction, discharge of ATF is promoted and a part of ATF runs over the drag torque reducing groove provided on the top surface of the segment piece (overflows out of the drag torque reducing groove) to form an oil film on the top surface of the segment friction material.

In addition, circulation of lubricating oil to the friction member becomes better by promoting discharge of the lubricating oil and a cooling effect increases. Thereby, heat resistance is improved. Moreover, an amount of the lubricating oil in a space to the counter member is hardly larger than the amount thereof required for separation. Thereby, shearing resistance occurred with the top surface of the friction member is restrained and peeling resistance is also improved.

Figure 11:
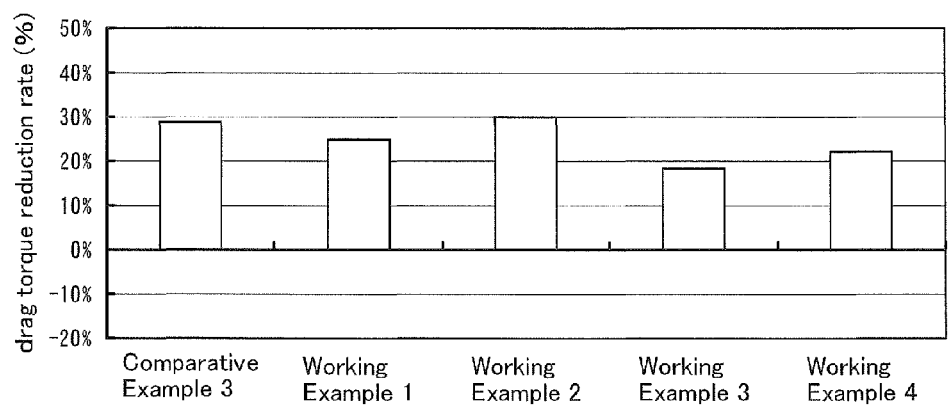
FIG. 11 is a graph showing an effect to reduce a drag torque as a reduction rate in the segment friction materials (Working Examples 1 to 4) as the wet friction material according to the first embodiment of the present invention and the Comparative Example 3 of the segment friction material as compared with the Comparative Example 1 of the segment friction material.

FIG. 11 is a bar chart showing a drag torque reduction rate as an average value within a range of relative rotation speeds from 500 rpm to 5000 rpm on the Comparative Example 3 of the segment friction material 11C and the segment friction materials 1A, 1B, 1C, and 1D according to the Working Examples 1 to 4 as compared with the Comparative Example 1 of the segment friction material 11A. As shown in FIG. 11, each of the segment friction materials 1A, 1B, 1C, and 1D according to the Working Examples 1 to 4 has a same level of effect to reduce a drag torque as that of the Comparative Example 3 of the segment friction material 11C.

In particular, it is found that the segment friction material 1B according to the Working Example 2 has a great effect to reduce a drag torque. In addition, results of the Working Examples 1, 2, 3, and 4 prove that the segment friction materials 1B and 1D according to the Working Examples 2 and 4 wherein the drag torque reducing groove is provided along the circumferential direction are more excellent in the drag torque reduction rate as compared with the segment friction materials 1A and 1C according to the Working Examples 1 and 3 wherein the drag torque reducing groove is provided along the direction almost at right angles to the straight line connecting the center point of the series of drag torque reducing grooves and the center of the circumference. Accordingly, the drag torque reducing groove along the circumferential direction is preferably provided only on a part of the top surfaces of the plurality of segment pieces.

Moreover, the segment friction materials 1A and 1B according to the Working Examples 1 and 2 wherein the series of drag torque reducing grooves having a width of 2 mm are provided at three places on the circumference are more excellent in the drag torque reduction rate as compared with the segment friction materials 1C and 1D according to the Working Examples 3 and 4 wherein the series of drag torque reducing grooves having a width of 1 mm are provided at five places on the circumference. Accordingly, a series of drag torque reducing grooves having a large width is more preferably provided only on a part of the top surfaces of the plurality of segment pieces and at fewer places on the circumference.

Figure 12:
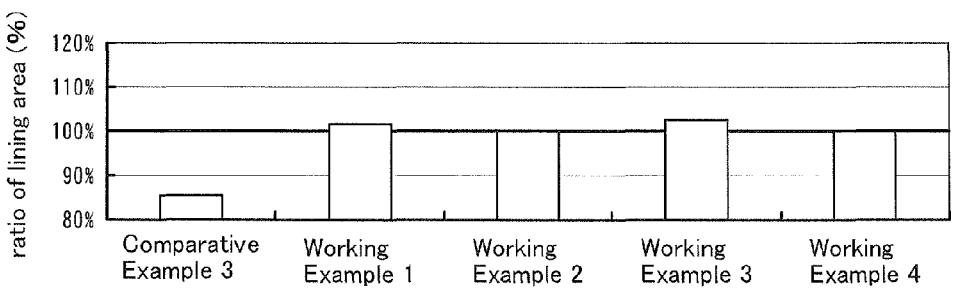
FIG. 12 is a graph showing a lining area as an area ratio in the segment friction materials (Working Examples 1 to 4) as the wet friction material according to the first embodiment of the present invention and the Comparative Example 3 of the segment friction material as compared with the Comparative Example 1 of the segment friction material.

FIG. 12 is a bar chart showing a ratio of a lining area on the Comparative Example 3 of the segment friction material 11C and the segment friction materials 1A, 1B, 1C, and 1D according to the Working Examples 1 to 4 as compared with the Comparative Example 1 of the segment friction material 11A. As shown in FIG. 12, it is found that each of the segment friction materials 1A, 1B, 1C, and 1D according to the Working Examples 1 to 4 has a lining area equivalent to that of the Comparative Example 1 of the segment friction material 11A and that the Comparative Example 3 of the segment friction material 11C has a small lining area.

In addition, a shape of a cross section of the drag torque reducing grove provided on the top surface of the segment piece is described referring to FIG. 13. As shown in FIG. 13A, in the segment friction material 1A according to the Working Example 1 of the present embodiment, a shape of a cross section of the drag torque reducing groove 5A is a substantially square U shape and a depth H2 thereof is 0.15 mm as described above that is 37.5% of the thickness H1, which is 0.4 mm, of the segment piece 3A. In addition, a width W2 of the drag torque reducing groove 5A is 2 mm as described above that is 26.7% of the radial width W1, which is 7.5 mm, of the segment piece 3A.

As a result of extensive experiments and research by the present inventors, it was found that the depth H2 of the drag torque reducing groove should be within a range of 10% to 70% of the thickness H1 of the segment piece, more preferably within a range of 30% to 50% and that the width W2 of the drag torque reducing groove should be within a range of 0.5 mm to 4.5 mm or within a range of 6% to 60% of the radial width W1 of the segment piece, more preferably within a range of 1 mm to 3 mm or within a range of 13% to 40% of the radial width W1 of the segment piece.

More specifically, if the width W2 of the drag torque reducing groove is less than 6% of the radial width W1 of the segment piece, an effect to reduce a drag torque by providing the drag torque reducing groove on the top surface cannot be sufficiently obtained. On the other hand, if the width W2 of the drag torque reducing groove is over 60% of the radial width W1 of the segment piece, a contact area of the wet friction member and the counter member in an engaged state decreases and it is hard to obtain high torque transmission efficiency sufficiently.

The width W2 of the drag torque reducing groove is more preferably within a range of 13% to 40% of the radial width W1 of the segment piece, since both a high torque transmission efficiency in an engaged state of the segment friction material and a low drag torque in a disengaged state can be more certainly achieved.

If the depth H2 of the drag torque reducing groove provided on the top surface is less than 10% of the thickness H1 of the segment piece, the lubricating oil is hard to flow into the drag torque reducing groove. On the other hand, if the depth H2 of the drag torque reducing groove provided on the top surface is over 70% of the thickness H1 of the segment piece, it serves as a normal oil groove or is likely to serve only as a flow passage to supply the lubricating oil and it is hard to obtain an effect to make the lubricating oil overflow to the top surface of the segment piece. Thereby, a separation distance between the wet friction member and the counter member such as the separator plate may not be maintained at an appropriate interval. Accordingly, the depth H2 of the drag torque reducing groove provided on the top surface is preferably within a range of 10% to 70% of the thickness H1 of the segment piece. In addition, the depth H2 of the drag torque reducing groove provided on the top surface is more preferably within a range of 30% to 50% of the thickness H1 of the segment piece, since the lubricating oil more certainly flows into the drag torque reducing groove provided on the top surface and an effect to make the lubricating oil overflow to the top surface of the segment piece can be more certainly obtained.

In addition, the shape of the cross section of the drag torque reducing groove is also not limited to a substantially square U-shape as in the segment friction materials 1A and 1B according to the Working Examples 1 and 2 of the present embodiment. Various shapes may be applied such as a drag torque reducing groove 5E having a substantially V-shape as shown in FIG. 13C, a drag torque reducing groove 5F having a substantially U-shape as shown in FIG. 13D, a drag torque reducing groove 5G having a tapered shape formed on both side surfaces as shown in FIG. 13E, and a drag torque reducing groove 5H having a step-like tapered shape on both side surfaces as shown in FIG. 13F.

Figure 13A:
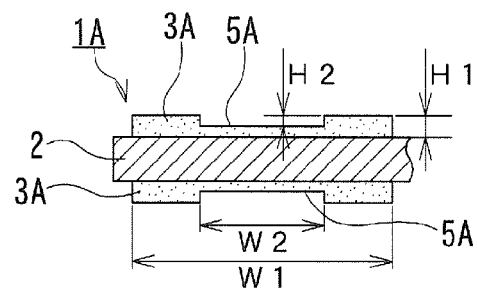
FIG. 13A is a view showing a cross section taken along line A-A of FIG. 3B.
Figure 13B:
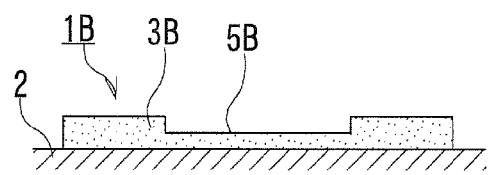
FIG. 13B is a view showing a shape of a cross section of a drag torque reducing groove in the segment friction material (Working Example 2) according to the first embodiment of the present invention.
Figure 13C:
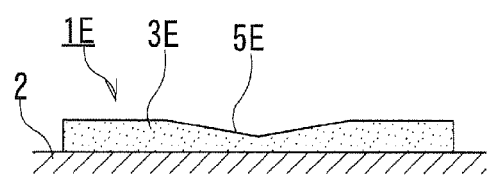
FIG. 13C is a view showing a shape of a cross section of a drag torque reducing groove in a segment friction material according to a first modified example of the first embodiment of the present invention.
Figure 13D:
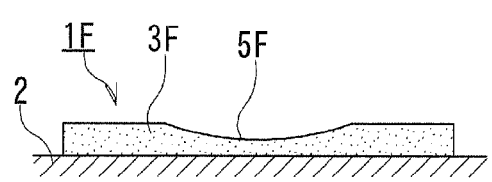
FIG. 13D is a view showing a shape of a cross section of a drag torque reducing groove in a segment friction material according to a second modified example of the first embodiment of the present invention.
Figure 13E:
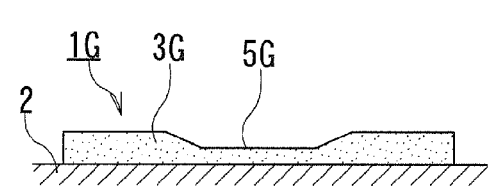
FIG. 13E is a view showing a shape of a cross section of a drag torque reducing groove in a segment friction material according to a third modified example of the first embodiment of the present invention.
Figure 13F:
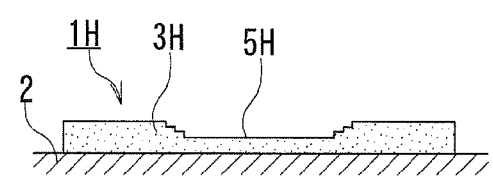
FIG. 13F is a view showing a shape of a cross section of a drag torque reducing groove in a segment friction material according to a fourth modified example of the first embodiment of the present invention.
Figure 13G:
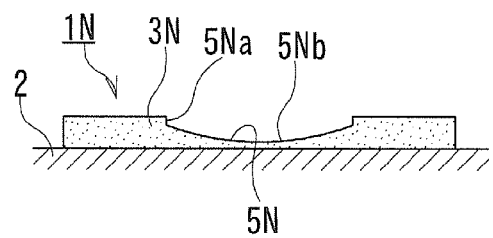
FIG. 13G is a view showing a shape of a cross section of a drag torque reducing groove in a segment friction material according to a fifth modified example of the first embodiment of the present invention.

As in the segment friction material 1B according to the Working Example 2 of the present embodiment shown in FIG. 13B, both side surfaces of the drag torque reducing groove 5B are cut at right angles to the top surface of the segment piece 3B and combined with the substantially U-shaped drag torque reducing groove 5F as shown in FIG. 13D to form a drag torque reducing groove 5N having a vertical step formed on both side surfaces and an arcuate bottom as shown in FIG. 13G, namely a groove 5Na having a constant width formed up to a point in a depth direction and a curved face 5Nb formed therefrom to a deepest portion thereof. Such a shape may be also applied. As described above, the drag torque reducing grooves 5, 5A, 5B, 5C, 5D, 5E, 5F, 5G, 5H, 5L, 5M, and 5N should not be fixed to a specific shape of a cross section as well as drag torque reducing grooves 5J, 5K, 5P, and 5Q described below.

More specifically, segment friction materials 1E, 1F, 1G, 1H, and 1N as the wet friction material according to the first modified example, the second modified example, the third modified example, and the fourth modified example of the first embodiment may also obtain an effect to reduce a drag torque equivalent to those of the segment friction materials 1A, 1B, 1C, and 1D according to the Working Examples 1 to 4 of the first embodiment.

Next, segment friction materials as a wet friction material according to Working Examples 5 and 6 of the first embodiment are described referring to FIGS. 14 and 15.

As shown in FIG. 14A, a segment friction material 1J according to the Working Example 5 of the first embodiment comprises a metal core 2 having a flat ring shape and segment pieces 3, 3J. A total of thirty pieces of segment pieces 3, 3J are stuck on each of both surfaces along an entire circumference of the metal core 2 with an adhesive at an interval 4 to be a flow passage of ATF. A circumferential width of the segment piece 3, 3J is 16 mm, a radial width is 7.5 mm, a thickness of the segment piece 3, 3J is 0.8 mm, and a width of the interval (oil groove) 4 is 2 mm.

In addition, as shown in FIG. 14B, right and left outer peripheral corner portions of the segment piece 3, 3J form a C face 3a and a C face 3Ja. More specifically, the right and left outer peripheral corner portions of the segment piece 3, 3J are chamfered.

The segment friction material 1J according to the Working Example 6 of the first embodiment is distinguished from the segment friction material 1D according to the Working Example 4 in the following respect. A drag torque reducing groove 5J is provided to extend along a circumferential direction only on top surfaces of fifteen segment pieces 3J among the thirty pieces of segment pieces 3, 3J. The segment piece 3 and the segment piece 3J are disposed alternately. More specifically, the drag torque reducing groove 5J is provided every other segment piece of the plurality of segment pieces 3, 3J.

As shown in FIG. 14B, a width of the drag torque reducing groove 5J is 2 mm and a depth of the drag torque reducing groove 5J is 0.15 mm.

In addition, the drag torque reducing grooves 5J are provided at the fifteen places on the circumference such that each of them extends from one end to the other end that face the interval (oil groove) 4. Center points 5Ja of the respective segment pieces 3J are located at positions on the circumference that make an angle of approximately 24 degrees each other with a center O of the circumference. More specifically, the drag torque reducing grooves 5J disposed at the fifteen places are provided at positions where the circumference of the segment friction material 1J is divided almost equally.

As a result, the segment friction material 1J as the wet friction material and a separator plate as a counter material certainly separate from each other and a drag torque in a disengaged state is significantly reduced. Moreover, an effect to separate the segment friction material 1J and the counter material uniformly appears over the entire circumference of the segment friction material 1J. Thereby, a further stable effect to reduce a drag torque can be obtained. In addition, a decrease in lining area can be minimized, since the drag torque reducing groove provided on the top surface of the segment piece is provided only on fifteen pieces among the thirty segment pieces.

Figure 15A:
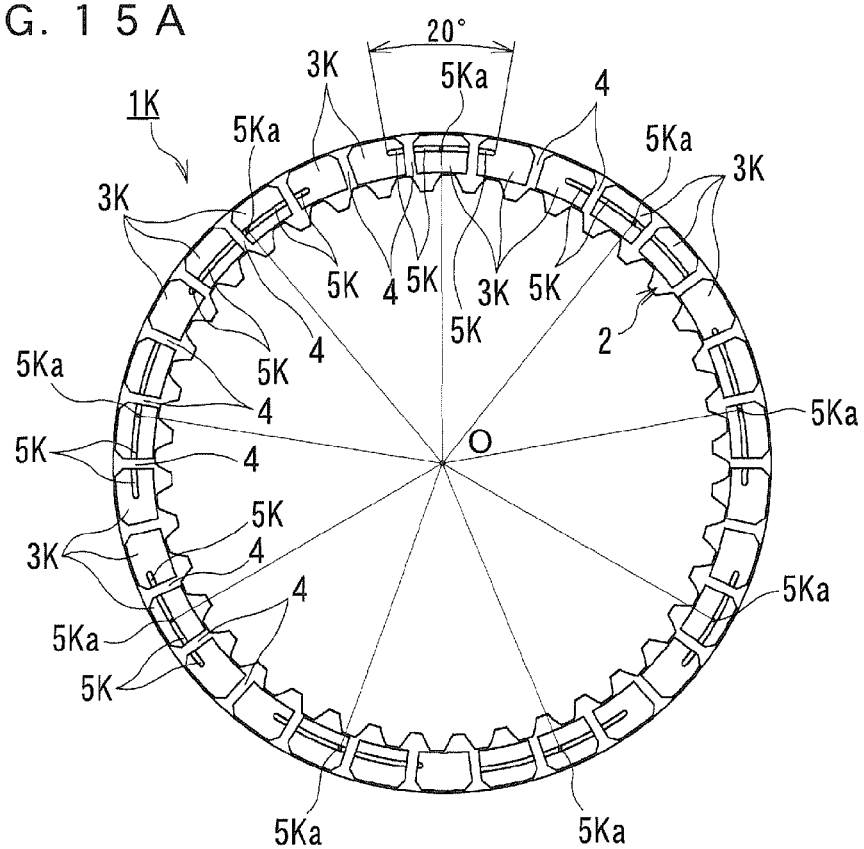
FIG. 15A is a plan view showing an entire structure of a segment friction material according to Working Example 6 of the first embodiment of the present invention.

Moreover, as shown in FIG. 15A, a segment friction material 1K according to the Working Example 6 of the first embodiment comprises a metal core 2 having a flat ring shape and segment pieces 3K. Thirty segment pieces 3K are stuck on each of both surfaces along an entire circumference of the metal core 2 at an interval 4 to be a flow passage of ATF. A circumferential width of the segment piece 3K is 16 mm, a radial width is 7.5 mm, a thickness of the segment piece 3K is 0.8 mm, and a width of the interval (oil groove) 4 is 2 mm.

Figure 15B:
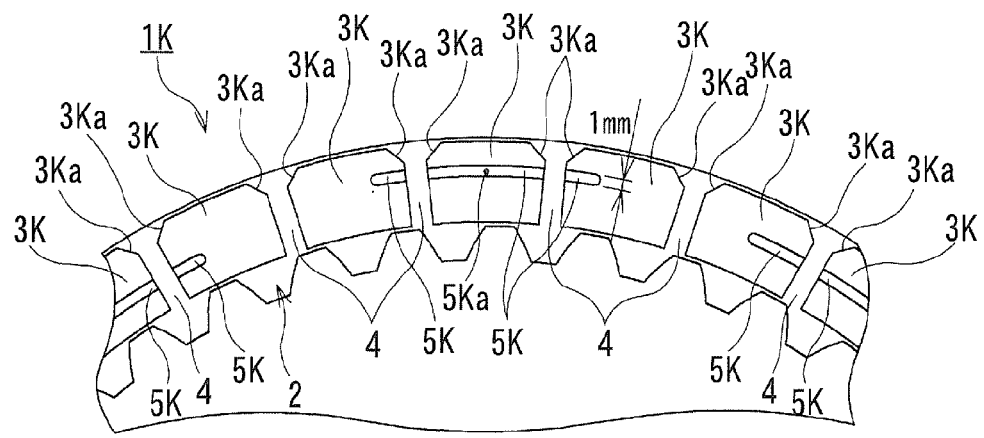
FIG. 15B is a partial plan view showing enlargement of a part thereof.

In addition, as shown in FIG. 15B, each of right and left outer peripheral corner portions of the segment piece 3K forms a C face 3Ka. More specifically, each of the right and left outer peripheral corner portions of the segment piece 3K is chamfered.

The segment friction material 1K according to the Working Example 6 is distinguished from the segment friction material 1J according to the Working Example 5 in the following respect. A series of drag torque reducing grooves 5K is provided at nine places on the circumference of the segment friction material 1K on all of top surfaces of the thirty segment pieces 3K. As shown in FIG. 15B, a width of the drag torque reducing groove 5K is 1 mm and a depth of the drag torque reducing groove 5K is 0.15 mm.

In addition, the series of drag torque reducing grooves 5K are provided at nine places on the circumference to extend over the segment pieces 3K that are arranged in three or four pieces. Center points 5Ka thereof are located at positions on the circumference that make an angle of approximately 40 degrees each other with a center O of the circumference. More specifically, the series of drag torque reducing grooves 5K disposed at the nine places are provided at positions where the circumference of the segment friction material 1K is divided almost equally.

Moreover, the series of drag torque reducing grooves 5K, which are provided at the nine places on the circumference and each of which extends over the segment pieces 3K arranged in three or four pieces, have a positions in a radial direction slightly shifted, respectively.

In addition, the series of drag torque reducing grooves 5K is provided on all the top surfaces of the segment pieces 3K. However, the series of drag torque reducing grooves 5K provided at the nine places separate from each other. Accordingly, the segment friction material 1K has a part without the drag torque reducing groove 5K disposed in the entire circumference thereof and can assure a friction surface required for torque transmission capacity by reducing a decrease in a ratio of a lining area.

The segment friction materials 1J and 1K as the wet friction material according to the Working Examples 5 and 6 of the first embodiment also can obtain an effect to reduce a drag torque equivalent to those of the segment friction materials 1A, 1B, 1C, and 1D according to the Working Examples 1 to 4 of the first embodiment.

As described above, in the segment friction materials 1A, 1B, 1C, 1D, 1E, 1F, 1G, 1H, 1J, 1K, 1L, 1M, and 1N as the wet friction material according to the first embodiment, there is provided a part without the drag torque reducing groove in the entire area in the radial direction of each of the segment friction materials 1A, 1B, 1C, 1D, 1E, 1F, 1G, 1H, 1J, 1K, 1L, 1M, and 1N is provided on a part in the circumferential direction, and except for this part, the drag torque reducing groove is provided on the top surfaces of the plurality of segment pieces. Thereby, discharge of the lubricating oil in a disengaged state is further promoted while maintaining a large lining area to such an extent that it does not affect torque transmission capacity, heat resistance, and peeling resistance and an excellent effect to reduce a drag torque can be obtained in a wide range of relative rotation speed.

Figure 16:
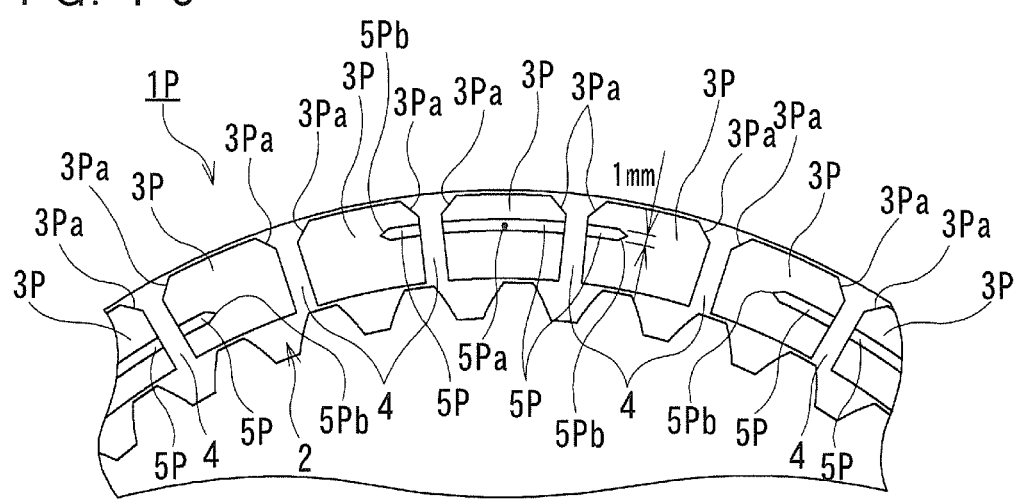
FIG. 16 is a partial plan view showing enlargement of a part of a segment friction material according to a modified example of the Working Example of the first embodiment of the present invention.

A segment friction material 1P according to a modified example of the Working Example 6 shown in FIG. 16 comprises thirty pieces of segment pieces 3P and a series of drag torque reducing grooves 5P provided at nine places on a circumference of the segment friction material 1P on all of top surfaces of the thirty pieces of segment pieces 3P. As shown in FIG. 15B, a width of the drag torque reducing groove 5P is 1 mm and a depth of the drag torque reducing groove 5P is 0.15 mm. Each of both end portions 5Pb of the series of drag torque reducing grooves 5P is cut into an acute angle portion with an apex at a center of the groove. Each of both the end portions 5Pb of the series of drag torque reducing grooves 5P may be also formed to have an obtuse angle portion with an apex at the center of the groove width.

Figure 17:
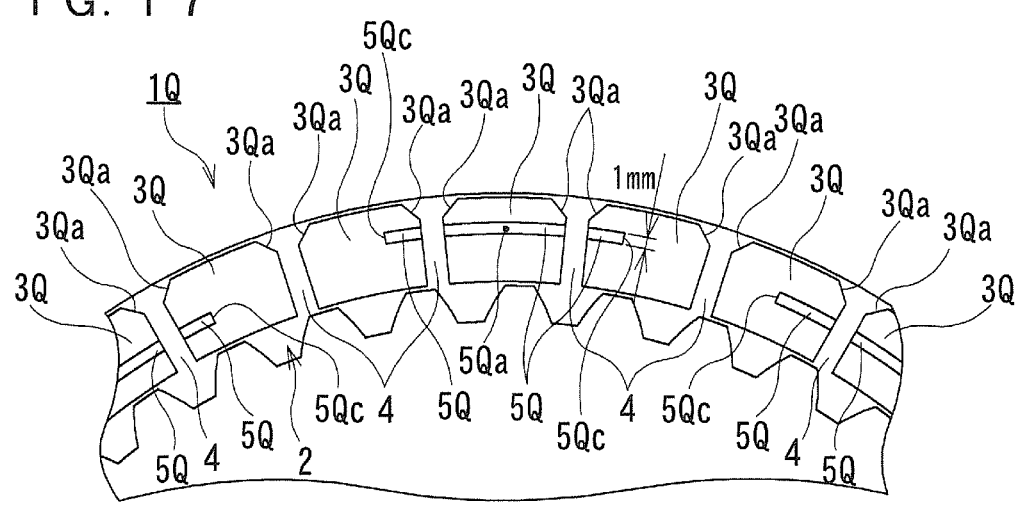
FIG. 17 is a partial plan view showing enlargement of a part of a segment friction material according to another modified example of the Working Example of the first embodiment of the present invention.

In addition, a segment friction material 1Q according to another modified example of the Working Example 6 shown in FIG. 17 comprises a drag torque reducing groove 5Q having a width of 1 mm and a depth of 0.15 mm. Each of both end portions 5Qc of a series of drag torque reducing grooves 5Q stops at a cut line radially extending from a center O shown in FIG. 15. More specifically, each of both the end portions 5Qc is made by cutting at right angles to the drag torque reducing groove 5Q. The modified examples of the Working Example 6 shown in FIGS. 16 and 17 are the same as the Working Example 6, except for a shape of both the end portions of the drag torque reducing groove 5P, 5Q.

[Second Embodiment]

Next, Comparative Example of a wet friction material related to a second embodiment of the present invention is described referring to FIG. 18, and a wet friction material according to the second embodiment of the present invention is described referring to FIGS. 19 to 22. Among wet friction materials according to the present invention, the second embodiment is related to a ring-type friction material wherein a ring shaped friction material substrate is stuck on both surfaces along an entire circumference of a ring-shaped metal core and subjected to press working or cutting work while leaving a plurality of island shaped portions.

FIG. 18 includes a plan view showing a structure of a ring-type friction material related to the ring-type friction material according to the second embodiment of the present invention and a view showing a cross section thereof.

Figure 18A:
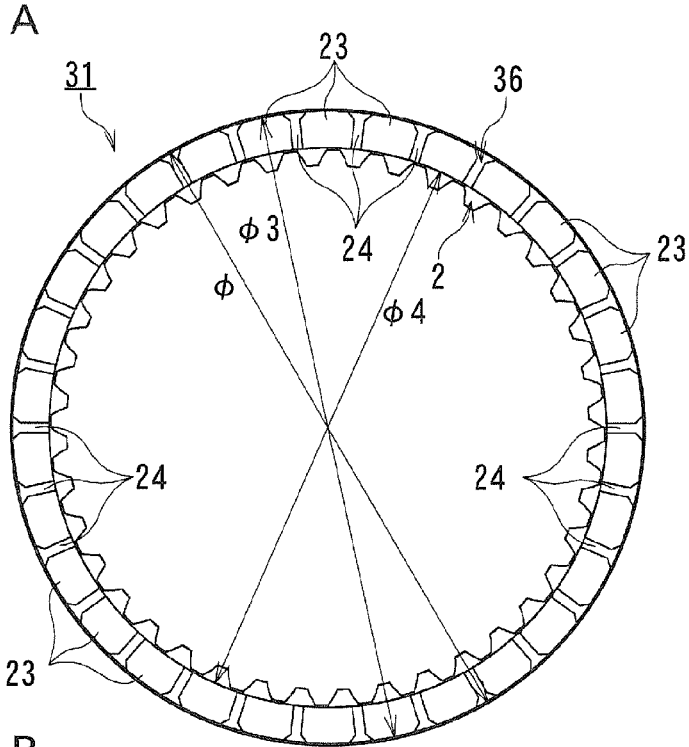
FIG. 18A is a plan view showing an entire structure of Comparative Example 4 of a ring-type friction material.

As shown in FIG. 18A, Comparative Example 4 of a ring-type friction material 31 comprises a metal core 2 having a flat ring shape and a ring shaped friction material substrate 36 stuck on each of both surfaces of the metal core 2 with an adhesive (thermosetting resin). After the adhesive is heated and cured, press working is performed to form thirty island shaped portions 23 per one surface along the entire circumference at an interval 24 to be a flow passage of ATF.

Figure 18B:
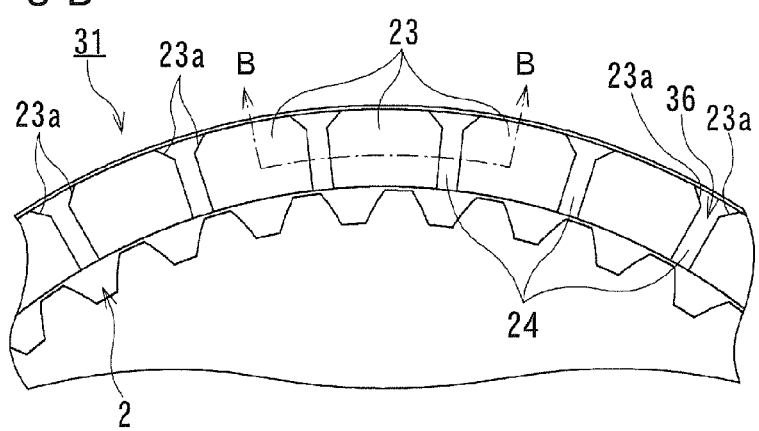
FIG. 18B is a partial plan view showing enlargement of a part thereof.
Figure 18C:
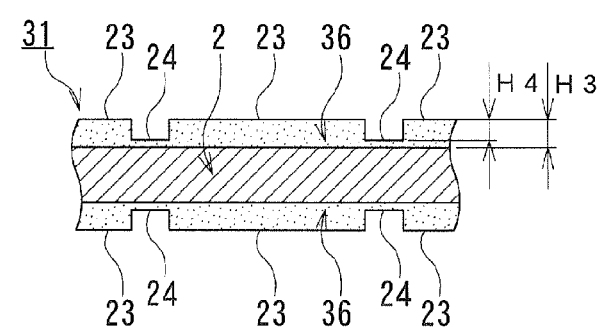
FIG. 18C is a sectional view taken along line B-B of FIG. 18B.

An outer diameter of the metal core 2 is 181 mm, a thickness of the metal core 2 is 0.8 mm, an outer diameter Φ3 of the ring shaped friction material substrate 36 is 180 mm, and an inner diameter Φ4 is 165 mm. In addition, a circumferential width (length in a horizontal direction) of the island shaped portion 23 is 16 mm, a radial width (length in a vertical direction) is 7.5 mm, and a width of the interval (oil groove) 24 is 2 mm. In addition, as shown in FIG. 18B, each of right and left outer peripheral corner portions of the island shaped portion forms a C face 23a. More specifically, each of the right and left outer peripheral corner portions of the island shaped portion 23 is chamfered. As shown in a sectional view of FIG. 18C, a thickness H3 of the island shaped portion 23 is 0.5 mm and a depth H4 of the interval (oil groove) 24 is 0.4 mm.

As compared with the Comparative Example 4 of the ring-type friction material having such structures, a structure of the ring-type friction material as the wet friction material according to the second embodiment is described referring to FIGS. 19 to 22.

Figure 19A:
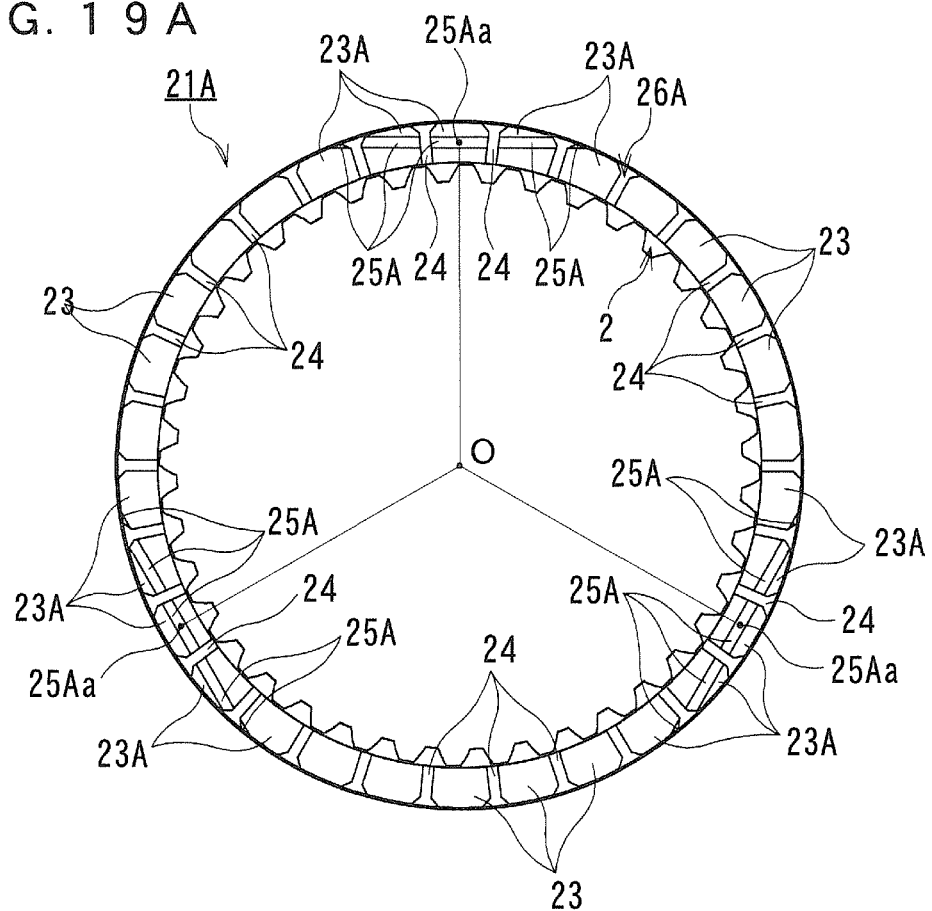
FIG. 19A is a plan view showing an entire structure of a ring-type friction material according to Working Example 7 of a second embodiment of the present invention.

As shown in FIG. 19A, a ring-type friction material 21A according to Working Example 7 of the second embodiment comprises a metal core 2 having a flat ring shape and a ring shaped friction material substrate 26A stuck on each of both surfaces of the metal core 2 with an adhesive (thermosetting resin). After the adhesive is heated and cured, press working is performed to form a total of thirty island shaped portions 23, 23A per one surface along an entire circumference at an interval 24 to be a flow passage of ATF.

Figure 19B:
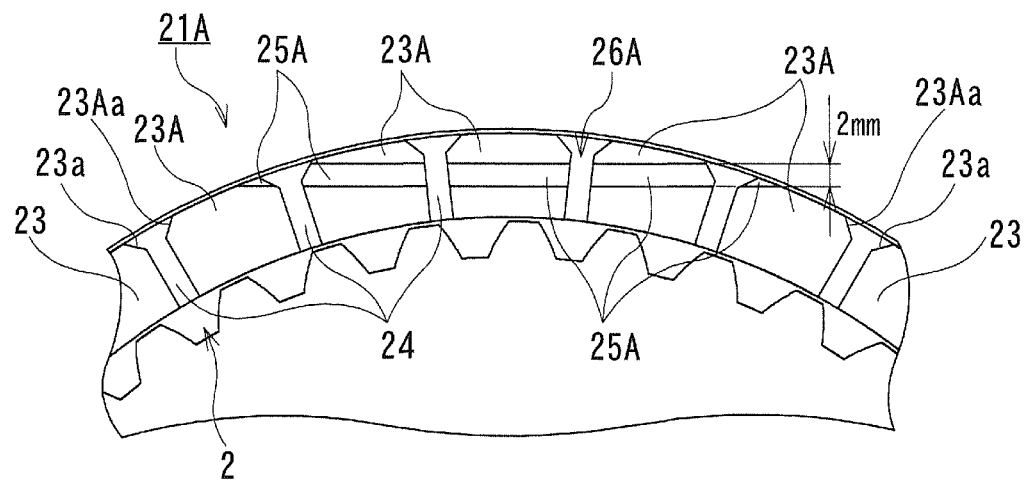
FIG. 19B is a partial plan view showing enlargement of a part thereof.

A circumferential width (length in a horizontal direction) of the island shaped portion 23, 23A is 16 mm, a radial width (length in a vertical direction) is 7.5 mm, a thickness of the island shaped portion 23, 23A is 0.5 mm, a depth of the interval (oil groove) 24 is 0.4 mm, and a width is 2 mm. In addition, as shown in FIG. 19B, right and left outer peripheral corner portions of the island shaped portion 23, 23A form a C face 23a and a C face 23Aa. More specifically, the right and left outer peripheral corner portions of the island shaped portion 23, 23A are chamfered.

The ring shaped friction material substrate 26A was produced by punching a friction material substrate into a ring shape. The friction material substrate is made by impregnating a papermaking body having a fiber component and a filler component with a thermosetting resin, heating, and curing. Here, as the fiber, an aramid fiber and pulp were used. As the filler, diatom earth, graphite, and carbon fiber were used. In addition, a phenolic resin is used as the thermosetting resin. A ring shaped friction material substrate according to each of the following Working Examples is produced in the same manner, too.

The ring-type friction material 21A according to the Working Example 7 is distinguished from the Comparative Example 4 of the ring-type friction material in the following respects. The island shaped portion 23A among the thirty island shaped portions 23, 23A is arranged in five in a row. A series of drag torque reducing grooves 25A is provided at three places on the circumference of the ring-type friction material 21A along a direction almost at right angles to a straight line connecting a center point 25Aa thereof and a center O of the circumference (which is also a center of the ring-shaped metal core 2). A series of drag torque reducing grooves 25A is provided on a part of top surfaces of the island shaped portions 23A arranged in five in a row. As shown in FIG. 19B, the drag torque reducing groove 25A has a width of 2 mm and a depth of 0.15 mm.

The drag torque reducing groove 25A is formed by press working at the same time as the total of thirty island shaped portions 23, 23A are formed by press working. A drag torque reducing groove according to each of the following Working Examples is formed in the same manner, too. In addition, the center points 25Aa of the series of drag torque reducing grooves 25A, which are provided at the three places on the circumference and each of which extends over the island shaped portions 23A arranged in five, are located at positions on the circumference that make an angle of approximately 120 degrees each other with the center O of the circumference. More specifically, the series of drag torque reducing grooves 25A disposed at the three places are provided at positions where the circumference of the ring-type friction material 21A is divided almost equally.

Figure 20A:
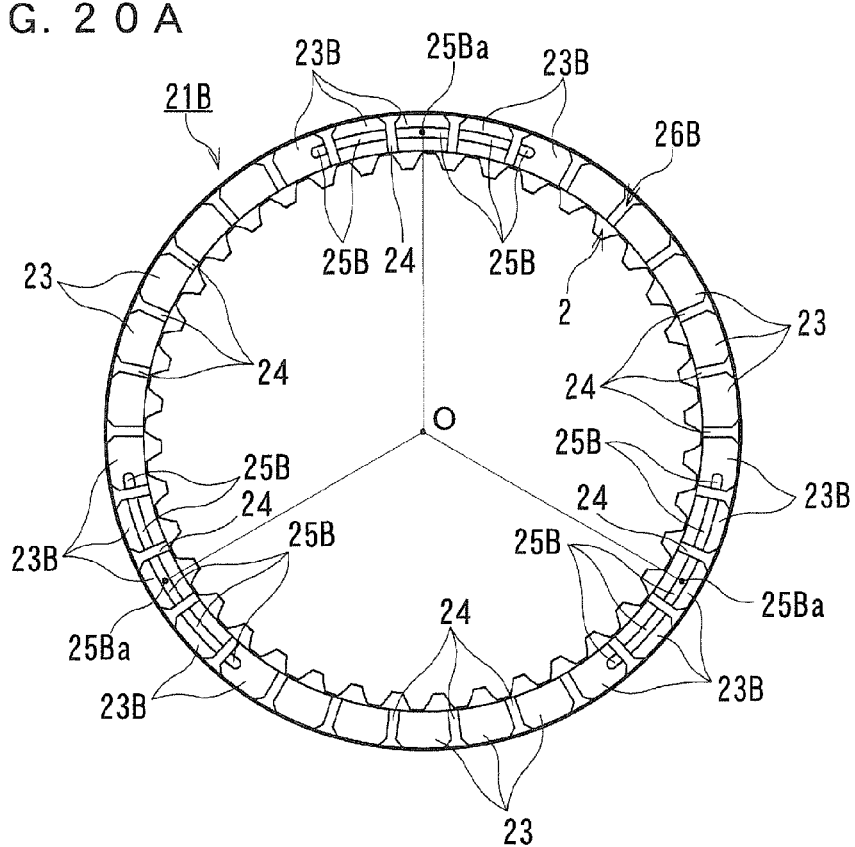
FIG. 20A is a plan view showing an entire structure of a ring-type friction material according to Working Example 8 of the second embodiment of the present invention.

Next, as shown in FIG. 20A, a ring-type friction material 21B according to Working Example 8 of the second embodiment comprises a metal core 2 having a flat ring shape and a ring shaped friction material substrate 26B stuck on each of both surfaces of the metal core 2 with an adhesive (thermosetting resin). After the adhesive is heated and cured, press working is performed to form a total of thirty island shaped portions 23, 23B per one surface along an entire circumference at an interval (oil groove) 24 to be a flow passage of ATF.

Figure 20B:
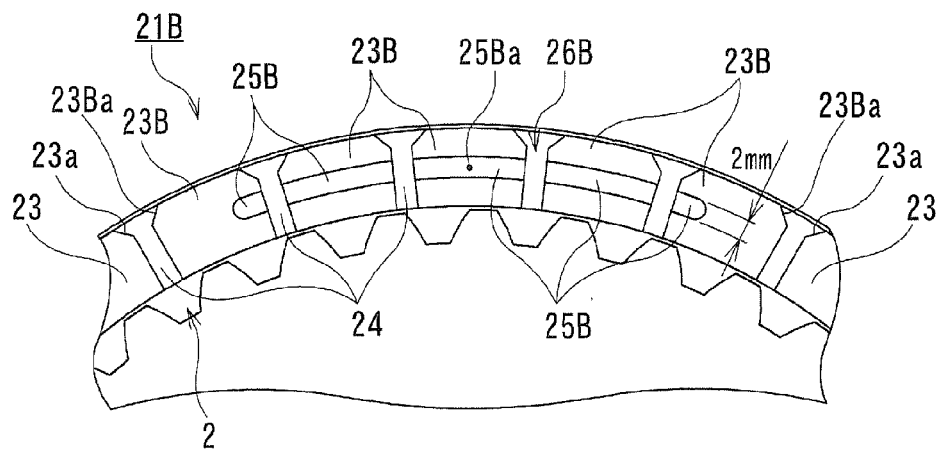
FIG. 20B is a partial plan view showing enlargement of a part thereof.

A circumferential with of the island shaped portion 23, 23B is 16 mm, a radial width is 7.5 mm, a thickness of the island shaped portion 23, 23B is 0.5 mm, a depth of the interval (oil groove) 24 is 0.4 mm, and a width is 2 mm. In addition, as shown in FIG. 20B, right and left outer peripheral corner portions of the island shaped portion 23, 23B form a C face 23a and a C face 23Ba. More specifically, the right and left outer peripheral corner portions of the island shaped portion 23, 23B are chamfered.

The ring-type friction material 21B according to the Working Example 8 is distinguished from the ring-type friction material 21A according to the Working Example 7 in the following respect. Instead of the drag torque reducing groove along the direction almost at right angles to the straight line connecting the center point 25Aa of the series of drag torque reducing grooves 25A and the center O of the circumference, a series of drag torque reducing grooves 25B is provided to extend along a circumferential direction (direction crossing the oil groove 24). The series of drag torque reducing grooves 25B are provided at three places on the circumference of the ring-type friction material 21B. They are provided on a part of a top surface of the island shaped portion 23B among the island shaped portions 23, 23B (thirty in total). As shown in FIG. 20B, the drag torque reducing groove 25B has a width of 2 mm and a depth of 0.15 mm.

In addition, center points 25Ba of the series of drag torque reducing grooves 25B, which are provided at the three places on the circumference and each of which extends over the island shaped portions 23B arranged in five, are located at positions on the circumference that make an angle of approximately 120 degrees each other with a center O of the circumference. More specifically, the series of drag torque reducing grooves 25B provided at the three places are provided at positions where the circumference of the ring-type friction material 21B is divided almost equally.

In addition, as shown in FIG. 21A, a ring-type friction material 21C according to Working Example 9 of the second embodiment comprises a metal core 2 having a flat ring shape and a ring shaped friction material substrate 26C stuck on each of both surfaces of the metal core 2 with an adhesive (thermosetting resin). After the adhesive is heated and cured, press working is performed to form a total of thirty island shaped portions 23, 23C per one surface along an entire circumference at an interval 24 to be a flow passage of ATF.

A circumferential width of the island shaped portion 23, 23C is 16 mm, a radial width is 7.5 mm, a thickness of the island shaped portion 23, 23C is 0.5 mm, a depth of the interval (oil groove) 24 is 0.4 mm, and a width is 2 mm. In addition, as shown in FIG. 21B, right and left outer peripheral corner portions of the island shaped portion 23, 23C form a C face 23*a* and a C face 23Ca. More specifically, the right and left outer peripheral corner portions of the island shaped portion 23, 23C are chamfered.

The ring-type friction material 21C according to the Working Example 9 is distinguished from the ring-type friction material 21A according to the Working Example 7 in the following respects. A series of drag torque reducing grooves 25C is provided to extend along a direction almost at right angles to a straight line connecting a center point 25Ca thereof and a center O of the circumference (direction crossing the oil groove 24). The series of drag torque reducing grooves 25C are provided at five places, not at three places on the circumference of the ring-type friction material 21C. They are provided only on a top surface of the island shaped portion 23B, which is a part of construction, among the thirty island shaped portions 23, 23B. In addition, as shown in FIG. 21B, a width of the drag toque reducing groove 25C is 1 mm which is narrower than that of the drag torque reducing groove 25A of the ring-type friction material 21A. The drag toque reducing groove 25C has a depth of 0.15 mm.

Moreover, as shown in FIG. 21A, center points 25Ca of the series of drag torque reducing grooves 25C, which are provided at the five places on the circumference and each of which extends over the island shaped portions 23C arranged in five, are located at positions on the circumference that make an angle of approximately 72 degrees each other with the center O of the circumference. More specifically, the series of drag torque reducing grooves 25C disposed at the five places are provided at positions where the circumference of the ring-type friction material 21C is divided almost equally.

Figure 22A:
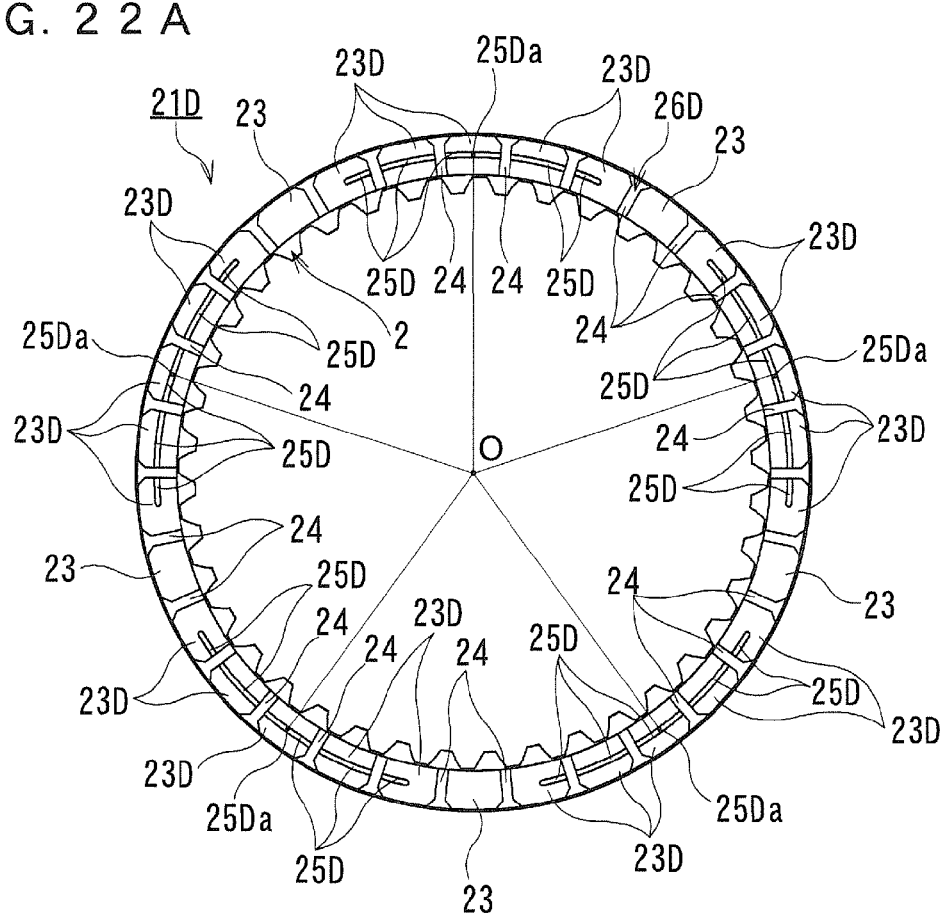
FIG. 22A is a plan view showing an entire structure of a ring-type friction material according to Working Example 10 of the second embodiment of the present invention.

As shown in FIG. 22A, a ring-type friction material 21D according to Working Example 10 of the second embodiment comprises a metal core 2 having a flat ring shape and a ring shaped friction material substrate 26D stuck on each of both surfaces of the metal core 2 with an adhesive (thermosetting resin). After the adhesive is heated and cured, press working is performed to form a total of thirty island shaped portions 23, 23D per one surface along an entire circumference at an interval 24 to be a flow passage of ATF.

Figure 22B:
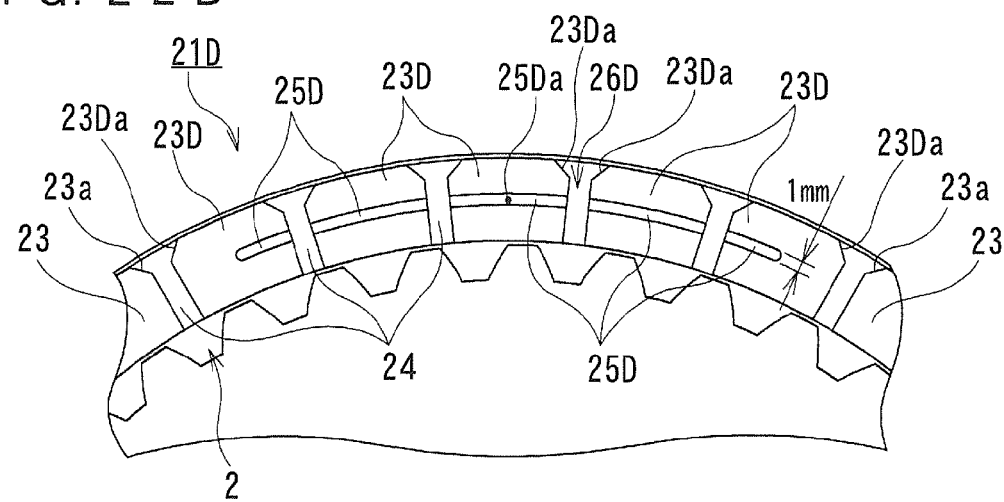
FIG. 22B is a partial plan view showing enlargement of a part thereof.

A circumferential width of the island shaped portion 23, 23D is 16 mm, a radial width is 7.5 mm, a thickness of the island shaped portion 23, 23D is 0.5 mm, a depth of the interval (oil groove) 24 is 0.4 mm, and a width is 2 mm. In addition, as shown in FIG. 22B, right and left outer peripheral corner portions of the island shaped portion 23, 23D form a C face 23*a* and a C face 23Da. More specifically, the right and left outer peripheral corner portions of the island shaped portion 23, 23D are chamfered.

The ring-type friction material 21D according to the Working Example 10 is distinguished from the ring-type friction material 21C according to the Working Example 7 in the following respect. Instead of the drag torque reducing groove along the direction almost at right angles to the straight line connecting the center point 25Ca of the series of drag toque reducing grooves 25C and the center O of the circumference, a series of drag toque reducing grooves 25D is provided to extend along a circumferential direction at five places on the circumference of the ring-type friction material 21. The series of drag toque reducing grooves 25D are provided on a part of top surfaces of the island shaped portions 23D among the thirty island shaped portions 23, 23D. As shown in FIG. 22B, a width of the drag torque reducing groove 25D is 1 mm and a depth of the drag torque reducing groove 25D is 0.15 mm.

In addition, center points 25Da of the series of drag torque reducing grooves 25D which are provided at the five places on the circumference and each of which extends over the island shaped portions 23D arranged in five, are located at positions on the circumference that make an angle of approximately 72 degrees each other with the center O of the circumference. More specifically, the series of drag toque reducing grooves 25D disposed at the five places are provided at positions where the circumference of the ring-type friction material 21D is divided almost equally.

A relationship between a relative rotation speed and a drag torque was examined on the ring-type friction materials 21A, 21B, 21C, and 21D according to the second embodiment under conditions similar to those of the above-described first embodiment. It was proved that they had a great effect to reduce a drag torque in a wide range of relative rotation speeds (500 rpm to 5000 rpm) as compared with the Comparative Example 4 of the ring-type friction material 31.

Such effects may be obtained as follows. ATF flowing through the oil groove formed in the radial direction of the ring shape flows into a new discharge passage provided in a direction crossing the oil groove or provided on a part of the oil grooves along the direction almost at right angles to the straight line connecting the center point of the series of drag torque reducing grooves and the center of the circumference or along the circumferential direction. Thereby, discharge of ATF is promoted. Moreover, a part of ATF runs over the drag toque reducing groove provided on the top surface of the island shaped portion (overflows out of the drag torque reducing groove) to form an oil film on the top surface of the ring-type friction material.

As described above, in the ring-type friction materials 21A, 21B, 21C, and 21D according to the second embodiment, a part without the drag torque reducing groove provided over the entire area in the radial direction of the ring-type friction material is provided on a part in the circumferential direction, and except for this part, the drag torque reducing groove is provided on the top surfaces of the plurality of island shaped portions. Thereby, discharge of the lubricating oil in a disengaged state is further promoted while maintaining a large lining area to such an extent that it does not affect a torque transmission capacity, heating resistance, and peeling resistance and an excellent effect to reduce a drag torque can be obtained in a wide range of relative rotation speeds.

In each of the embodiments, the examples made by sticking the segment piece or the ring shaped friction material substrate on both surfaces of the metal core were described. However, the segment piece or the ring shaped friction material substrate may be stuck only on one surface of the metal core depending on a specification.

In each of the embodiments, only the examples made by sticking thirty segment pieces on one surface of the metal core and the examples made by thirty island shaped portions on one surface of the metal core were described. However, the number of the segment pieces per one surface of the metal core is not limited to thirty and also the number of the island shaped portions is not limited to thirty. Both of them may be freely arranged at any desired sheets or any desired number.

In each of the embodiments, the examples made by setting the width of the drag torque reducing groove at 1mm, 2 mm, or 2.5 mm and the depth of the drag torque reducing groove at 0.15 mm were described. However, the width and the depth of the drag torque reducing groove are not limited thereto. Both of them may be changed to such an extent that an opposite relationship between a drag torque and required torque transmission capacity is achieved. In particular, the width of the drag torque reducing groove is preferably within a range of 6% to 60% of the radial width of the segment piece or 6% to 60% of the radial width of the island shaped portion, more preferably within a range of 13% to 40%. In addition, the depth of the drag torque reducing groove is preferably within a range of 10% to 70% of the thickness of the segment piece or 10% to 70% of the thickness of the island shaped portion, more preferably within a range of 30% to 50%.

In each of the embodiments, the examples made by providing the series of drag torque reducing grooves at three places, five places, or nine places on the circumference or providing the drag torque reducing groove at fifteen places were described. However, the present invention is not limited thereto. The series of drag torque reducing grooves may be provided at two places, four places, six places or more on the circumference.

In each of the embodiments, the examples made by providing the drag torque reducing groove on each one of the segment pieces disposed at the plurality of places on the circumference or providing the series of drag torque reducing grooves over three adjacent pieces, four adjacent pieces, or five adjacent pieces of the segment pieces, or over five adjacent island shaped portions were described. However, the present invention is not limited thereto. The drag torque reducing groove may be also provided on each one of the island shaped portions disposed at the plurality of places on the circumference, and the series of drag torque reducing grooves may be also provided over two adjacent pieces, or six or more adjacent pieces of the segment pieces or over two adjacent, three adjacent, four adjacent, six or more adjacent island shaped portions.

In each of the embodiments, the drag torque reducing groove is formed by press working. However, the present invention is not limited thereto. The drag torque reducing groove may be formed by other method such as cutting work by a blade and cutting work with a laser beam. Similarly, the method for forming the island shaped portion in the ring-type friction material is also not limited to press working. Other method such as cutting work with a blade and cutting work by a laser beam may be used instead.

In each of the embodiments, the drag toque reducing groove is formed after sticking the segment piece or the ring shaped friction material substrate on the metal core. However, the timing of forming the drag torque reducing groove is also not limited thereto. It may be when the friction material substrate is made into paper, or before or after cutting the produced friction material substrate.

In addition, the right and left corner portions of the segment piece or the right and left corner portions of the island shaped portion of the ring shaped friction material substrate in each of the embodiments are chamfered. However, rounding work may be performed or the corner portions may be left as they are.

In the practice of the present invention, the present invention is not limited to each of the present embodiments and each of the Working Examples with respect to a structure, a shape, quantity, a material, a size, a connecting relationship, a manufacturing method or the like of other parts on the segment friction material and the ring-type friction material as the wet friction material. In addition, not all of the numeric values described in the present embodiment of the invention indicate a critical value, and a certain numeric value indicates an appropriate value which is suitable for the embodiment. Even if the above numeric values may be changed slightly, the present invention can be practiced as well. The preferred embodiments described herein are illustrative and not restrictive, the scope of the invention being indicated in the appended claims and all variations which come within the meaning of the claims are intended to be embraced therein.

The invention claimed is:

1. A wet friction material comprising:
   ring-shaped metal core; and
   a plurality of segment pieces made by cutting a friction material substrate,
   wherein the plurality of segment pieces is joined on both surfaces along an entire circumference or on one surface along an entire circumference of the ring-shaped metal core with an adhesive at intervals, side by side so as to form oil grooves therebetween,
   wherein the plurality of segment pieces includes first segment pieces and second segment pieces, the first segment piece having a drag torque reducing groove disposed on atop surface thereof in a direction crossing the oil groove, and the second segment piece having no drag torque reducing groove disposed on atop surface thereof,
   wherein the first segment pieces and the second segment pieces are arranged in a line along the entire circumference of a ring shape of the ring-shaped metal core, and
   wherein the first segment pieces and the second segment pieces are arranged such that the drag torque reducing groove is provided on two or more adjacent segment pieces of the plurality of segment pieces to define a series of the drag torque reducing grooves along the circumference of the ring shape and such that the series of the drag torque reducing grooves are provided at a plurality places on the entire circumference of the ring shape.

2. A wet friction material according to claim 1, wherein the first segment pieces and the second segment pieces are arranged such that centers of the plurality of drag torque reducing grooves are provided at positions where an entire circumference of the plurality of the segment pieces is divided almost equally.

3. A wet friction material comprising:
   a ring-shaped metal core; and
   a ring-shaped friction material substrate joined on both surfaces along an entire circumference or on one surface along an entire circumference of the ring-shaped metal core with an adhesive,
   wherein a plurality of island portions each having a segment shape is formed on the ring-shaped friction material substrate at intervals, side by side, with each other so as to form oil grooves therebetween,
   wherein the plurality of island portions include first island portions and second island portions, the first island portions having a drag torque reducing groove disposed on a top surface thereof in a direction crossing the oil groove, and the second island portions having no drag torque reducing groove disposed on a top surface thereof, wherein the first island portions and the second island portions are arranged in a line along the entire circumference of a ring shape of the ring-shaped metal core, and wherein the first island portions and the second island portions are arranged such that drag torque reducing groove is provided on two or more adjacent island portions of the plurality of island portions to define a series of the drag torque reducing grooves along the circumference of the ring shape and such that the series of the drag torque reducing grooves are provided at a plurality of places on the entire circumference of the ring shape.

4. A wet friction material according to claim 3, wherein the first island portions and the second island portions are arranged such that centers of the plurality of drag torque reducing grooves are provided at positions where an entire circumference of the plurality of the island portions is divided almost equally.

\* \* \* \* \*